US011017420B2

(12) United States Patent
Aihara et al.

(10) Patent No.: US 11,017,420 B2
(45) Date of Patent: May 25, 2021

(54) PROCESSING REQUESTS TO BUY ITEMS OR SERVICES

(71) Applicant: International Business Machines Corporation, Armonk, NY (US)

(72) Inventors: Toru Aihara, Kanagawa-ken (JP); Noboru Kamijo, Kanagawa-ken (JP); Kazumasa Ochiai, Kanagawa-ken (JP); Hidekazu Tanaka, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 14/057,221

(22) Filed: Oct. 18, 2013

(65) Prior Publication Data

US 2014/0156367 A1 Jun. 5, 2014

(30) Foreign Application Priority Data

Nov. 30, 2012 (JP) .............................. JP2012-263286

(51) Int. Cl.
*G06Q 30/00* (2012.01)
*G06Q 30/02* (2012.01)

(52) U.S. Cl.
CPC ................ *G06Q 30/0214* (2013.01)

(58) Field of Classification Search
CPC .................................................. G06Q 30/0214
USPC ....................................................... 705/14.16
See application file for complete search history.

(56) References Cited

U.S. PATENT DOCUMENTS

| 7,917,402 | B2* | 3/2011 | Rolf | G06Q 30/02 |
| | | | | 705/14.1 |
| 9,264,151 | B1* | 2/2016 | Emigh | G06Q 30/0211 |
| 2007/0265921 | A1* | 11/2007 | Rempe | G06Q 30/02 |
| | | | | 705/14.16 |
| 2010/0287057 | A1* | 11/2010 | Aihara | G06K 7/1095 |
| | | | | 705/16 |
| 2012/0150598 | A1* | 6/2012 | Griggs | G06Q 30/0214 |
| | | | | 705/14.16 |
| 2015/0127438 | A1* | 5/2015 | Wedderburn | G06Q 30/0214 |
| | | | | 705/14.16 |

FOREIGN PATENT DOCUMENTS

| CN | 102637283 | 8/2012 |
| CN | 102708507 | 10/2012 |

(Continued)

OTHER PUBLICATIONS

CN Office Action, dated Jul. 4, 2016, Application No. 201310628214. 9, 2 pages for IDS material, CN Office action 17 pages.

(Continued)

*Primary Examiner* — Gautam Ubale
*Assistant Examiner* — Michael I Ezewoko
(74) *Attorney, Agent, or Firm* — Schmeiser, Olsen & Watts, LLP; Nicholas L. Cadmus

(57) ABSTRACT

A method and system for processing shopping information. The shopping information, which pertains to an item purchased by a user, is read from a mobile device, and was scanned by the mobile device from an item tag attached to the item. The item relates to another user. A set of affiliates is determined from analysis of the shopping information. Each affiliate is entitled to receive a reward due to purchase of the item.

3 Claims, 22 Drawing Sheets

SHOPPING INFORMATION 430

| USER ID 431 | ITEM INFORMATION 780 | | | | | | | | PURCHASE INFORMATION | | | |
|---|---|---|---|---|---|---|---|---|---|---|---|---|
| | MANUFACTURER 781 | ITEM NAME 782 | ITEM CODE 783 | PRICE 784 | STORE 785 | AFFILIATE ID 786 | UNIQUE ID 787 | AFFILIATE REGISTRATION INTENTION 788 | BUYING DATE AND TIME 432 | CHECKOUT DATE AND TIME 433 | QUANTITY 434 | SUBTOTAL 435 |
| 060087 | N SPORTS | SHIRT | 4902720078111 | 3900 | A550 | | | | 3/17/2011 11:35 | 3/17/2011 12:05 | 1 | 3900 |
| 060087 | G CLOTHING | PANTS | 4908420078023 | 480 | A550 | 035063 | 0322122... | | 3/17/2011 11:40 | 3/17/2011 12:05 | 3 | 1440 |
| 060087 | D SPORTS | BALL | 4908420090619 | 1780 | A550 | 060087 | 0462152... | YES | 3/17/2011 12:00 | 3/17/2011 12:05 | 1 | 1780 |

(56) References Cited

FOREIGN PATENT DOCUMENTS

| | | |
|---|---|---|
| JP | 2001117847 | 4/2001 |
| JP | 2002163565 | 6/2002 |
| JP | 2004318279 | 11/2004 |
| JP | 2006126948 | 5/2006 |
| JP | 2006227817 | 8/2006 |
| JP | 2006309342 | 11/2006 |
| JP | 2007241508 | 9/2007 |
| JP | 2008015972 | 1/2008 |

OTHER PUBLICATIONS

Iancu, Andrei; Remarked by Director Iancu at the Intellectual Property Owners Association 46th Annual Meeting; Sep. 24, 2018; retrieved from the Internet Nov. 18, 2018; https://www.uspto.gov/about-us/news-updates/remarks-director-iancu-intellectual-property-owners-46th-annual-meeting; 7 pages.

* cited by examiner

FIG. 3

ITEM INFORMATION DATABASE 760

| MANUFACTURER 761 | ITEM NAME 762 | ITEM CODE 763 | PRICE 764 | STORE 765 |
|---|---|---|---|---|
| ... | ... | ... | ... | ... |
| C FOODS | POTATO CHIPS | 4908220078023 | 105 | S100 |
| N SPORTS | SHOES | 4902720078050 | 5800 | D102 |
| L FOODS | CHOCOLATE | 4909411045630 | 158 | R301 |
| N SPORTS | SHIRT | 4902720078111 | 3900 | A550 |
| G CLOTHING | PANTS | 4908420078023 | 480 | A550 |
| D SPORTS | BALL | 4908420090619 | 1780 | A550 |
| N SPORTS | BAG | 4905430176345 | 3980 | Y841 |
| F CLOTHING | SOCKS | 4906540976578 | 495 | Y841 |
| P BEVERAGE | COLA | 4908220090619 | 99 | Y841 |
| R FOODS | GUM | 4909430176345 | 105 | S010 |
| N SPORTS | JACKET | 4902740976578 | 5980 | D123 |

FIG. 4

EXAMPLE OF DATA FORMAT OF ITEM TAG

| | |
|---|---|
| STORE NAME | YYY STORE HAKOZAKI |
| STORE ID | Y841 |
| AFFILIATE ID (OPTION) | |
| SCAN DATE AND TIME (OPTION) | 6/19/2011 14:50 |
| MANUFACTURER NAME (OPTION) | F CLOTHING |
| ITEM NAME | SOCKS |
| ITEM CODE (JAN/GS-1) | 4906540976578 |
| PRICE (YEN) | 495 |
| STOCK (OPTION) | 5 |

FIG. 5
SHOPPING INFORMATION 430

| USER ID 431 | ITEM INFORMATION 780 | | | | | | | | | PURCHASE INFORMATION | | | |
|---|---|---|---|---|---|---|---|---|---|---|---|---|---|
| | MANUFACTURER 781 | ITEM NAME 782 | ITEM CODE 783 | PRICE 784 | STORE 785 | AFFILIATE ID 786 | UNIQUE ID 787 | AFFILIATE REGISTRATION INTENTION 788 | | BUYING DATE AND TIME 432 | CHECKOUT DATE AND TIME 433 | QUANTITY 434 | SUBTOTAL 435 |
| 274431 | N SPORTS | BAG | 4905430176345 | 3980 | Y841 | | | | | 6/19/2011 14:20 | 6/19/2011 15:32 | 1 | 3980 |
| 274431 | F CLOTHING | SOCKS | 4906540976578 | 495 | Y841 | 274431 | | YES | | 6/19/2011 14:50 | 6/19/2011 15:32 | 2 | 990 |
| 274431 | P BEVERAGE | COLA | 4908220090619 | 99 | Y841 | | | | | 6/19/2011 15:30 | 6/19/2011 15:32 | 1 | 99 |

FIG. 6

EXAMPLE OF DATA FORMAT OF ITEM TAG

| | |
|---|---|
| STORE NAME | DDD STORE HAKOZAKI |
| STORE ID | D102 |
| AFFILIATE ID (OPTION) | 198413 |
| SCAN DATE AND TIME (OPTION) | 11/6/2010 17:00 |
| MANUFACTURER NAME (OPTION) | N SPORTS |
| ITEM NAME | SHOES |
| ITEM CODE (JAN/GS-1) | 4902720078050 |
| PRICE (YEN) | 5800 |
| STOCK (OPTION) | 10 |

FIG 7
SHOPPING INFORMATION 430

| USER ID 431 | ITEM INFORMATION 780 ||||||||| PURCHASE INFORMATION ||||
|---|---|---|---|---|---|---|---|---|---|---|---|---|
| | MANUFACTURER 781 | ITEM NAME 782 | ITEM CODE 783 | PRICE 784 | STORE 785 | AFFILIATE ID 786 | UNIQUE ID 787 | AFFILIATE REGISTRATION INTENTION 788 | BUYING DATE AND TIME 432 | CHECKOUT DATE AND TIME 433 | QUANTITY 434 | SUBTOTAL 435 |
| 035063 | C FOODS | POTATO CHIPS | 4908220078023 | 105 | S100 | | | | 10/6/2010 15:00 | 10/6/2010 15:05 | 2 | 210 |
| 035063 | N SPORTS | SHOES | 4902720078050 | 5800 | D102 | 198413 | | | 11/6/2010 17:00 | 11/6/2010 17:10 | 1 | 5800 |
| 035063 | L FOODS | CHOCOLATE | 4909411045630 | 158 | R301 | | | | 12/3/2010 20:10 | 12/3/2010 20:13 | 1 | 158 |

EXAMPLE OF DATA FORMAT OF ITEM TAG

| | |
|---|---|
| UNIQUE ID (OPTION) | 04621525108413 |
| STORE NAME | AAA STORE HAKOZAKI |
| STORE ID | A550 |
| SCAN DATE AND TIME (OPTION) | 3/17/2011 12:00 |
| MANUFACTURER NAME (OPTION) | D SPORTS |
| ITEM NAME | BALL |
| ITEM CODE (JAN/GS-1) | 4908420090619 |
| PRICE (YEN) | 1780 |
| STOCK (OPTION) | 10 |

(b)

EXAMPLE OF DATA FORMAT OF ITEM TAG

| | |
|---|---|
| UNIQUE ID (OPTION) | 03221221376419 |
| STORE NAME | AAA STORE HAKOZAKI |
| STORE ID | A550 |
| SCAN DATE AND TIME (OPTION) | 3/17/2011 11:40 |
| MANUFACTURER NAME (OPTION) | G CLOTHING |
| ITEM NAME | PANTS |
| ITEM CODE (JAN/GS-1) | 4908420078023 |
| PRICE (YEN) | 480 |
| STOCK (OPTION) | 10 |

FIG. 9
SHOPPING INFORMATION 430

| USER ID 431 | ITEM INFORMATION 780 ||||||||| PURCHASE INFORMATION ||||
| | MANUFACTURER 781 | ITEM NAME 782 | ITEM CODE 783 | PRICE 784 | STORE 785 | AFFILIATE ID 786 | UNIQUE ID 787 | AFFILIATE REGISTRATION INTENTION 788 | BUYING DATE AND TIME 432 | CHECKOUT DATE AND TIME 433 | QUANTITY 434 | SUBTOTAL 435 |
|---|---|---|---|---|---|---|---|---|---|---|---|---|
| 060087 | N SPORTS | SHIRT | 4902720078111 | 3900 | A550 | | | | 3/17/2011 11:35 | 3/17/2011 12:05 | 1 | 3900 |
| 060087 | G CLOTHING | PANTS | 4908420078023 | 480 | A550 | | 0322122… | | 3/17/2011 11:40 | 3/17/2011 12:05 | 3 | 1440 |
| 060087 | D SPORTS | BALL | 4908420090619 | 1780 | A550 | 060087 | 0462152… | YES | 3/17/2011 12:00 | 3/17/2011 12:05 | 1 | 1780 |

FIG. 10

AFFILIATE DATABASE 640

| UNIQUE ID 641 | REGISTRANT INFORMATION 642 | | |
|---|---|---|---|
| | AFFILIATE ID 643 | AFFILIATE ID 644 | AFFILIATE ID 645 |
| 03221221376419 | 035063 | | |
| ... | ... | ... | ... |

FIG. 11

SHOPPING INFORMATION 430

| USER ID 431 | ITEM INFORMATION 780 ||||||||| BUYING DATE AND TIME 432 | PURCHASE INFORMATION |||
| | MANUFACTURER 781 | ITEM NAME 782 | ITEM CODE 783 | PRICE 784 | STORE 785 | AFFILIATE ID 786 | UNIQUE ID 787 | AFFILIATE REGISTRATION INTENTION 788 | | CHECKOUT DATE AND TIME 433 | QUANTITY 434 | SUBTOTAL 435 |
|---|---|---|---|---|---|---|---|---|---|---|---|---|
| 060087 | N SPORTS | SHIRT | 4902720078111 | 3900 | A550 | | | | 3/17/2011 11:35 | 3/17/2011 12:05 | 1 | 3900 |
| 060087 | G CLOTHING | PANTS | 4908420078023 | 480 | A550 | 035063 | 0322122… | | 3/17/2011 11:40 | 3/17/2011 12:05 | 3 | 1440 |
| 060087 | D SPORTS | BALL | 4908420090619 | 1780 | A550 | 060087 | 0462152… | YES | 3/17/2011 12:00 | 3/17/2011 12:05 | 1 | 1780 |

FIG. 12

AFFILIATE DATABASE 640

| UNIQUE ID 641 | REGISTRANT INFORMATION 642 | | |
|---|---|---|---|
| | AFFILIATE ID 643 | AFFILIATE ID 644 | AFFILIATE ID 645 |
| 03221221376419 | 035063 | | |
| 04621525108413 | 060087 | | |
| ... | ... | ... | ... |

FIG. 13

SHOPPING INFORMATION DATABASE 630

| USER ID 631 | ITEM INFORMATION 780 ||||||| AFFILIATE REGISTRATION INTENTION 788 | PURCHASE INFORMATION ||||
|---|---|---|---|---|---|---|---|---|---|---|---|---|
| | MANUFACTURER 781 | ITEM NAME 782 | ITEM CODE 783 | PRICE 784 | STORE 785 | AFFILIATE ID 786 | UNIQUE ID 787 | | BUYING DATE AND TIME 632 | CHECKOUT DATE AND TIME 633 | QUANTITY 634 | SUBTOTAL 635 |
| ... | ... | ... | ... | ... | ... | ... | ... | | ... | ... | ... | ... |
| 035063 | C FOODS | POTATO CHIPS | 4908220078023 | 105 | S100 | | | | 10/6/2010 15:00 | 10/6/2010 15:05 | 2 | 210 |
| 035063 | N SPORTS | SHOES | 4902720078050 | 5800 | D102 | 198413 | | | 11/6/2010 17:00 | 11/6/2010 17:10 | 1 | 5800 |
| 035063 | L FOODS | CHOCOLATE | 4909410045630 | 158 | R301 | | | | 12/3/2010 20:10 | 12/3/2010 20:13 | 1 | 158 |
| 060087 | N SPORTS | SHIRT | 4902720078111 | 3900 | A550 | | | | 3/17/2011 11:35 | 3/17/2011 12:05 | 1 | 3900 |
| 060087 | G CLOTHING | PANTS | 4908420078023 | 480 | A550 | 035063 | 0322122... | | 3/17/2011 11:40 | 3/17/2011 12:05 | 3 | 1440 |
| 060087 | D SPORTS | BALL | 4908420090619 | 1780 | A550 | 060087 | 0462152... | YES | 3/17/2011 12:00 | 3/17/2011 12:05 | 1 | 1780 |
| 274431 | N SPORTS | BAG | 4905430176345 | 3980 | Y841 | | | | 6/19/2011 14:20 | 6/19/2011 15:32 | 1 | 3980 |
| 274431 | F CLOTHING | SOCKS | 4906540976578 | 495 | Y841 | 274431 | | YES | 6/19/2011 14:50 | 6/19/2011 15:32 | 2 | 990 |
| 274431 | P BEVERAGE | COLA | 4908220090619 | 99 | Y841 | | | | 6/19/2011 15:30 | 6/19/2011 15:32 | 1 | 99 |
| 035063 | R FOODS | GUM | 4909430176345 | 105 | S010 | | | | 7/7/2011 18:30 | 7/7/2011 18:40 | 2 | 210 |
| 035063 | N SPORTS | JACKET | 4902740976578 | 5980 | D123 | | | | 9/22/2011 11:15 | 9/22/2011 11:30 | 1 | 5980 |

FIG. 14

CHECKOUT INFORMATION 580

| USER ID 581 | ITEM CODE 582 | PRICE 583 | QUANTITY 584 | CHECKOUT REGISTRATION INFORMATION 585 | |
|---|---|---|---|---|---|
| ... | ... | ... | ... | ... | |
| 035063 | 4908220078023 | 105 | 2 | CREDIT xxxxxxxx | ⎫ FIRST CHECKOUT |
| 035063 | 4902720078050 | 5800 5% | 1 | CREDIT xxxxxxxx CHECKOUT ACCOUNT aaaaaaa | |
| 198413 | | | | | |
| 035063 | 4909411045630 | 158 | 1 | CREDIT xxxxxxxx | |
| 060087 | 4902720078111 | 3900 | 1 | CASH | ⎫ SECOND CHECKOUT |
| 060087 | 4908420078023 | 480 5% | 3 | CASH CHECKOUT ACCOUNT bbbbbbb | |
| 035063 | | | | | |
| 060087A | 4908420090619 | 1780 | 1 | CASH | |
| 274431 | 4905430176345 | 3980 | 1 | CREDIT yyyyyyyy | ⎫ THIRD CHECKOUT |
| 274431A | 4906540976578 | 495 | 2 | CREDIT yyyyyyyy | |
| 274431 | 4908220090619 | 99 | 1 | CREDIT yyyyyyyy | |
| 035063 | 4909430176345 | 105 | 2 | CREDIT xxxxxxxx | ⎫ FOURTH CHECKOUT |
| 035063 | 4902740976578 | 5980 | 1 | CREDIT xxxxxxxx | |

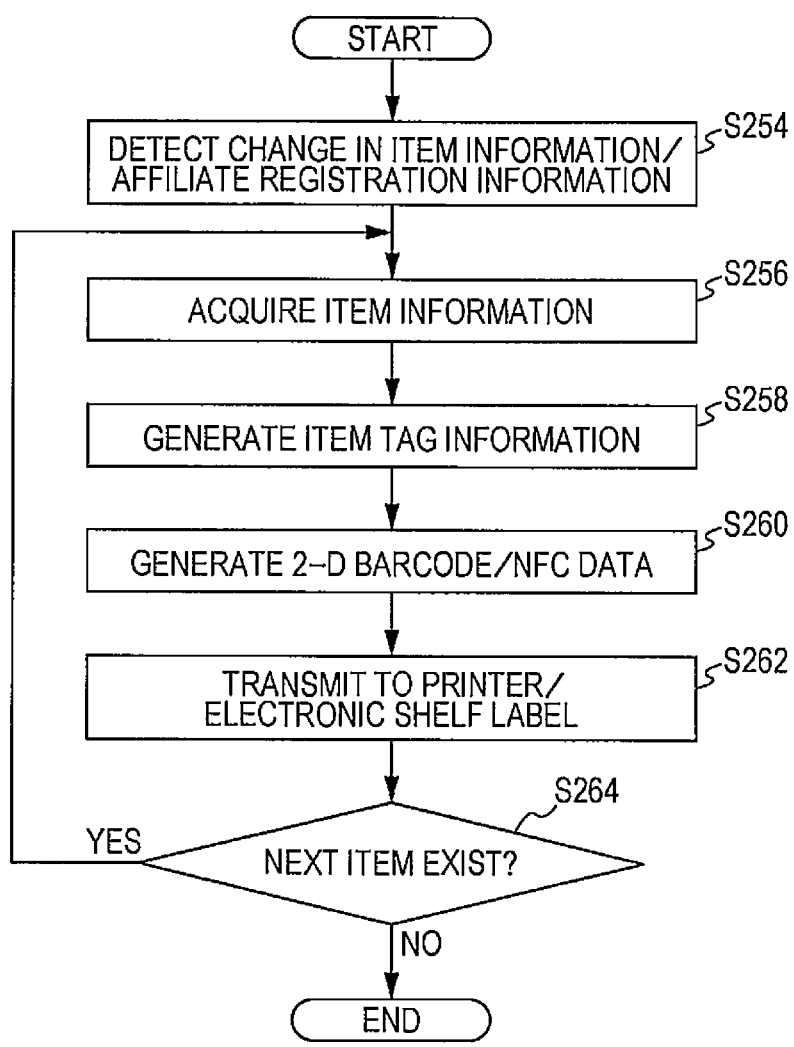

FIG. 20-1

(a) AFFILIATE DATABASE 640

| UNIQUE ID 641 | REGISTRANT INFORMATION 642 | | | |
|---|---|---|---|---|
| | AFFILIATE ID 643 | AFFILIATE ID 644 | AFFILIATE ID 645 | AFFILIATE ID 646 |
| a | A | | | |

(b) AFFILIATE DATABASE 640

| UNIQUE ID 641 | REGISTRANT INFORMATION 642 | | | |
|---|---|---|---|---|
| | AFFILIATE ID 643 | AFFILIATE ID 644 | AFFILIATE ID 645 | AFFILIATE ID 646 |
| a | A | | | |
| b | A | B | | |
| c | A | C | | |
| d | A | D | | |

(c) AFFILIATE DATABASE 640

| UNIQUE ID 641 | REGISTRANT INFORMATION 642 | | | |
|---|---|---|---|---|
| | AFFILIATE ID 643 | AFFILIATE ID 644 | AFFILIATE ID 645 | AFFILIATE ID 646 |
| a | A | | | |
| b | A | B | | |
| c | A | C | | |
| d | A | D | | |
| e | A | D | E | |

FIG. 20-2

(d) AFFILIATE DATABASE 640

| UNIQUE ID 641 | REGISTRANT INFORMATION 642 | | | |
|---|---|---|---|---|
| | AFFILIATE ID 643 | AFFILIATE ID 644 | AFFILIATE ID 645 | AFFILIATE ID 646 |
| a | A | | | |
| b | A | B | | |
| c | A | C | | |
| d | A | D | | |
| e | A | D | E | |
| f | A | D | E | F |
| g | A | D | E | G |

PROCESSING REQUESTS TO BUY ITEMS OR SERVICES

TECHNICAL FIELD

The present invention relates generally to a method and system for processing requests to buy items or services, and more particularly to a method and system for processing requests to buy items or services through use of affiliates.

BACKGROUND

A technique is known in which a card (goods card) retaining access destination information for use in buying an item and item information integrated with information on an advertiser is placed near a real item being a target of buying, when someone makes access to the access destination where the item is sold and performs a procedure of buying the item. An input of the advertiser information is required so that an input of the item information to buy the item into a terminal is directly used as the input of the advertiser information, and a sales promotion system calculates an advertisement fee to be paid to the advertiser on the basis of the advertiser information.

A technique is known in which information on a mobile terminal and information on an affiliated site that is established on a public server and on which an item sold at a brick-and-mortar store is posted are registered in advance in an information storage unit, in response to an access from the mobile terminal to the affiliated site. The access is registered in a history in the information storage unit, when an item is bought at the brick-and-mortar store. The mobile terminal acquires code information attached to the item and transmits item identifying information included in the code information to a management server A more effective method and system is needed for processing shopping information associated with purchased items.

BRIEF SUMMARY

The present invention provides a method for processing shopping information, said method comprising:

reading, from a mobile device by a processor of a computer system, shopping information pertaining to a purchase of an item by a user through use of the mobile device that scanned the shopping information from an item tag attached to the item, said item relating to another user; and said processor determining, from analysis of the shopping information, a set of affiliates wherein each affiliate of the set of affiliates is entitled to receive a reward due to the purchase of the item.

The present invention provides a computer program product, comprising a computer readable storage device having computer readable program code stored therein, said program code containing instructions which, upon being executed by a processor of a computer system, implement a method for processing shopping information, said method comprising:

said processor reading, from a mobile device, shopping information pertaining to a purchase of an item by a user through use of the mobile device that scanned the shopping information from an item tag attached to the item, said item relating to another user; and said processor determining, from analysis of the shopping information, a set of affiliates wherein each affiliate of the set of affiliates is entitled to receive a reward due to the purchase of the item.

The present invention provides a computer system comprising a processor, a memory coupled to the processor, and a computer readable storage device coupled to the processor, said storage device containing program code which upon being executed by the processor via the memory implements a method for processing shopping information, said method comprising:

said processor reading, from a mobile device, shopping information pertaining to a purchase of an item by a user through use of the mobile device that scanned the shopping information from an item tag attached to the item, said item relating to another user; and said processor determining, from analysis of the shopping information, a set of affiliates wherein each affiliate of the set of affiliates is entitled to receive a reward due to the purchase of the item.

BRIEF DESCRIPTION OF THE DRAWINGS

FIG. 3 illustrates an example of item information contained in an item information database, in accordance with embodiments of the present invention.

FIG. 4 illustrates an example of the data format of an item tag (paper shelf label), in accordance with embodiments of the present invention.

FIG. 5 illustrates an example of shopping information generated by acquiring item information from item tags (paper shelf labels) by a cellular phone, in accordance with embodiments of the present invention.

FIG. 6 illustrates an example of the data format of the item tag (paper shelf label), in accordance with embodiments of the present invention.

FIG. 7 illustrates an example of the shopping information generated by acquiring item information from item tags (paper shelf labels) by the cellular phone, in accordance with embodiments of the present invention.

FIG. 8 includes illustrations of examples of the data format of an item tag (NFC tag), in accordance with embodiments of the present invention.

FIG. 9 illustrates an example of shopping information generated by acquiring item information from item tags (NFC tags) by the cellular phone, in accordance with embodiments of the present invention.

FIG. 10 illustrates an example of the content of an affiliate database, in accordance with embodiments of the present invention.

FIG. 11 illustrates an example of shopping information updated by referring to the affiliate database after the cellular phone acquires item information from item tags (NFC tags) and generates the shopping information, in accordance with embodiments of the present invention.

FIG. 12 illustrates an example of the content of the affiliate database, in accordance with embodiments of the present invention.

FIG. 13 illustrates an example of shopping information contained in a shopping information database, in accordance with embodiments of the present invention.

FIG. 14 illustrates an example of checkout information transmitted from a shopping checkout management system to a store system.

FIG. 15 is a flowchart that illustrates an example of operations of an item tag controller, in accordance with embodiments of the present invention.

FIG. 20-1 includes illustrations of an example of how the content of the affiliate database changes when the affiliate chain develops, in accordance with embodiments of the present invention.

FIG. 20-2 is an illustration of an example of how the content of the affiliate database changes when the affiliate chain develops, in accordance with embodiments of the present invention.

DETAILED DESCRIPTION

Figure 1:
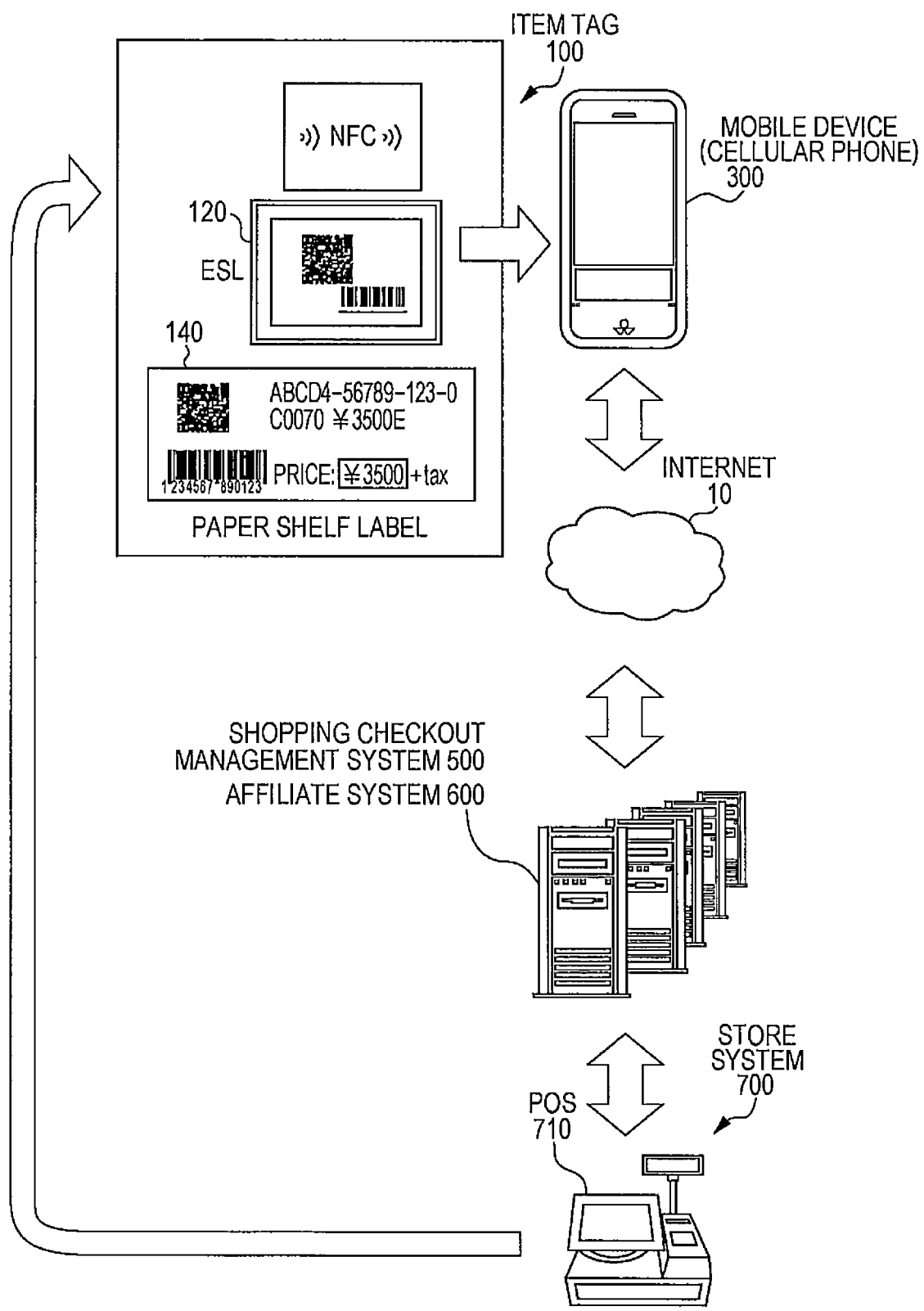
FIG. 1 illustrates an image of connections of devices included in a coordinated mobile shopping system, in accordance with embodiments of the present invention.

An embodiment of the present invention will be described below with reference to the accompanying drawings. The present invention is applicable to not only the sale of items but also the sale of services. The sale of items is described as an example in the present embodiment.

In the light of such objects, the present invention provides an apparatus for processing a request to buy an item or service. The request is based on information on the item or service. The information is read using a mobile information reading device from an information recording medium on which the information is recorded. The information recording medium is associated with the item or service. The apparatus includes a control unit and a determination unit. The control unit is configured to conduct control such that a first user is registered as an affiliate in association with the item or service. The determination unit is configured to determine that the first user is an affiliate or one of affiliates enticing a second user to buy the item or service when the second user reads information using a mobile information reading device from the information recording medium associated with the item or service relating to the first user and makes a request to buy the item or service on the basis of the information.

The control unit may be configured to conduct control such that the first user is registered as the affiliate in association with the item or service on a condition that the first user makes a request to buy the item or service independently of an action as an affiliate by another user or may be configured to conduct control such that the first user is registered as the affiliate in association with the item or service on a condition that the first user reads information using the mobile information reading device from the information recording medium associated with the item or service relating to another user and makes a request to buy the item or service on the basis of the information.

The control unit may be configured to conduct control such that the second user is registered as an affiliate in association with the item or service, and the determination unit may be configured to determine that at least one user of the second user and the user or users being the affiliate or affiliates enticing the second user to buy the item or service is an affiliate enticing the third user to buy the item or service when the third user reads information using a mobile information reading device from the information recording medium associated with the item or service relating to the second user and makes a request to buy the item or service on the basis of the information.

In that case, the determination unit may be configured to determine that a plurality of users including the at least one user are the affiliates enticing the third user to buy the item or service, and the control unit may be configured to conduct control such that a reward is provided to each of the plurality of users with an amount based on an order in which each of the plurality of users enticed another user to buy the item or service.

The control unit may be configured to conduct control such that a third user who makes a request to buy the item or service, the request resulting from an action by the second user, is registered as an affiliate in association with the item or service, and the determination unit may be configured to determine that at least one user of the third user and the user or users being the affiliate or affiliates enticing the third user to buy the item or service is an affiliate enticing a fourth user to buy the item or service when the fourth user reads information using a mobile information reading device from the information recording medium associated with the item or service relating to the third user and makes a request to buy the item or service on the basis of the information.

In that case, the determination unit may be configured to determine that a plurality of users including the at least one user are the affiliates enticing the fourth user to buy the item or service, and the control unit may be configured to conduct control such that a reward is provided to each of the plurality of users with an amount based on an order in which each of the plurality of users enticed another user to buy the item or service.

The information recording medium may be any one of an item tag attached to the item, a receipt given as proof for having bought the item or service, and the mobile information reading device having read information from the item tag or the receipt.

In that case, the item tag may be one of a tag with a two-dimensional barcode being printed thereon and a near field communication (NFC) tag.

The present invention also provides an apparatus for processing a request to buy an item. The request is based on item information. The item information is read using a mobile information reading device from an item tag on which the item information is recorded. The item tag is attached to the item. The apparatus includes an acquisition unit and a control unit. The acquisition unit is configured to acquire first buying information when a first buyer reads the item information using a mobile information reading device from the item tag attached to a first individual of the item and makes a request to buy the first individual of the item on the basis of the item information. If the first buyer intends to be an affiliate for the first individual of the item, the first buying information indicates that the first buyer is making the request to buy the first individual of the item and indicates that the first buyer is to be the affiliate for the first individual of the item. The control unit is configured to conduct control such that, in response to generation of checkout information being information for use in paying a price of the first individual of the item by the first buyer and being information indicating that the first buyer is the affiliate for the first individual of the item using the first buying information acquired by the acquisition unit, the price of the first individual of the item is paid by the first buyer and new item information in which the item information and the first buyer are associated with each other is recorded on a new item tag to be newly attached to the first individual of the item. The acquisition unit is configured to acquire second buying information when a second buyer reads the new item information using a mobile information reading device from the new item tag attached to the first individual of the item and makes a request to buy a second individual of the item on the basis of the new item information. The second individual is different from the first individual. The second buying information indicates that the second buyer is making the request to buy the second individual of the item and indicates that the buying of the item by the second buyer results from an action as the affiliate by the first buyer associated with the item information in the new item information. The control unit is configured to conduct control such that, in response to generation of checkout information for use in paying the price of the item by the second buyer and in providing a reward to the first buyer using the second buying information acquired by the acquisition unit, the price of the second individual of the item is paid by the second buyer and the reward is provided to the first buyer.

The present invention also provides an apparatus for processing a request to buy an item. The request is based on item information. The item information is read using a mobile information reading device from an item tag on which the item information is recorded. The item tag is attached to the item. The apparatus includes an acquisition unit, a storage unit, and a control unit. The acquisition unit is configured to acquire first buying information when a first buyer reads the item information using a mobile information reading device from the item tag attached to a first individual of the item and makes a request to buy the first individual of the item on the basis of the item information. If the first buyer intends to be an affiliate for the first individual of the item, the first buying information indicates that the first buyer is making the request to buy the first individual of the item and indicates that the first buyer is to be the affiliate for the first individual of the item. The storage unit is configured to store association information in which the first individual of the item and the first buyer are associated with each other. The control unit is configured to conduct control such that, in response to generation of checkout information for use in paying the price of the item by the first buyer using the first buying information acquired by the acquisition unit, the price of the item is paid by the first buyer. The acquisition unit is configured to acquire second buying information indicating that a second buyer is making a request to buy a second individual of the item and to update the second buying information such that the buying of the item by the second buyer results from an action as the affiliate by the first buyer associated with the first individual of the item in the association information when the second buyer reads the item information using a mobile information reading device from the item tag attached to the first individual of the item and makes the request to buy the second individual of the item on the basis of the item information. The second individual is different from the first individual. The control unit is configured to conduct control such that, in response to generation of checkout information for use in paying the price of the item by the second buyer and in providing a reward to the first buyer using the second buying information updated by the acquisition unit, the second individual of the item is paid by the second buyer and the reward is provided to the first buyer.

The present invention also provides a system for processing a request to buy an item or service. The request is based on information on the item or service. The information is read using a mobile information reading device from an information recording medium on which the information is recorded. The information recording medium is associated with the item or service. The system includes a recording unit, a determination unit, and a checkout processing unit. The recording unit is configured to record affiliate information onto the information recording medium associated with the item or service. The affiliate information indicates that a first user is an affiliate for the item or service. The determination unit is configured to determine that the first user indicated as being the affiliate for the item or service by the affiliate information is an affiliate or one of affiliates enticing a second user to buy the item or service when the second user reads information using a mobile information reading device from the information recording medium associated with the item or service relating to the first user and makes a request to buy the item or service on the basis of the information. The checkout processing unit is configured to perform processing for providing a reward to the first user determined to be the affiliate enticing the second user to buy the item or service by the determination unit.

The present invention also provides a method for processing a request to buy an item or service. The request is based on information on the item or service. The information is read using a mobile information reading device from an information recording medium on which the information is recorded. The information recording medium is associated with the item or service. The method includes the steps of registering a first user as an affiliate in association with the item or service and determining that the first user is an affiliate or one of affiliates enticing a second user to buy the item or service when the second user reads information using a mobile information reading device from the information recording medium associated with the item or service relating to the first user and makes a request to buy the item or service on the basis of the information.

The present invention also provides a program product for causing a computer to function as an apparatus for processing a request to buy an item or service. The request is based on information on the item or service. The information is read using a mobile information reading device from an information recording medium on which the information is recorded. The information recording medium is associated with the item or service. The program product causes the computer to function as a control unit and a determination unit. The control unit is configured to conduct control such that a first user is registered as an affiliate in association with the item or service. The determination unit is configured to determine that the first user is an affiliate or one of affiliates enticing a second user to buy the item or service when the second user reads information using a mobile information reading device from the information recording medium associated with the item or service relating to the first user and makes a request to buy the item or service on the basis of the information.

According to the present invention, a customer who acts in the real world can be set as an affiliate with respect to the sale of items or services at a brick-and-mortar store.

FIG. 1 illustrates an image of connections of devices included in an overall coordinated mobile shopping system (a plurality of data processing systems), in accordance with embodiments of the present invention. The mobile shopping system includes an item tag 100 including an ESL 120 called an electronic shelf label, a paper shelf label 140, and other labels, a mobile device 300 including a cellular phone and a smart phone, the Internet 10, a shopping checkout management system 500, and a store system 700 including a POS 710, as a basic configuration. The mobile shopping system further includes an affiliate system 600.

The item tag 100 is described as one of the ESL 120 and the paper shelf label 140, which are typical examples, in the embodiment below. However, it is not limited to these examples.

The item tag 100 indicates a label directly attached to an item, a small paper tag (item tag, price tag) directly appended to an item with a string or other elements, a shelf label placed on an item shelf or a show window in association with an item, digital signage, and/or other media.

The item tag 100 includes many pieces of information as code information, in addition to basic item information, such as an item name, price, and other information, regularly indicated by the label or shelf label. Thus the mobile device 300 can easily acquire the code information provided by the item tag 100 by scanning the item tag 100 by a shopper using the mobile device 300 (or holding the mobile device 300 over the item tag 100).

The code information provided by the item tag 100 as item information is acquired by the mobile device 300 as digitized information by reading of a two-dimensional barcode, near field communication (NFC), Bluetooth® communication, or other communication.

The code information provided by the item tag 100 is described in the embodiment below as one of the two-dimensional barcode and NFC data (NFC data exchange format (NDEF) data), which are typical examples. However, it is not limited to these examples. For example, it may include both the two-dimensional barcode and the NFC data.

In place of the item tag 100, a receipt given as proof for having brought an item, an item catalog for use in stay-at-home shopping, a menu at a restaurant, or other media may be used, and the code information may be acquired by reading of a two-dimensional barcode printed on these media. Moreover, in place of the item tag 100, a cellular phone that scans and stores the item tag 100, a receipt, or other media or that stores an electronic receipt or other media received from a store may also be used, and the code information may be acquired by reading the two-dimensional barcode displayed on the screen of the cellular phone or by receiving NFC data retained in the cellular phone through NFC communication. That is, in general, any medium that can record information may be used. Thus the item tag 100, receipt, item catalog, menu, and cellular phone can be regarded as examples of an information recording medium.

The mobile device 300 will be described in the embodiment below as the cellular phone 300, which is a typical example. However, it is not limited to the cellular phone. For example, it may be a dedicated shopping mobile device, such as the one having already been used in self scanning shopping in European countries.

The cellular phone 300 has introduced a shopping application (hereinafter referred to as "shopping app"). Most of the above-described functions can be achieved using existing hardware by simply installing such software. The shopping app may be means for achieving these functions.

Figure 2:
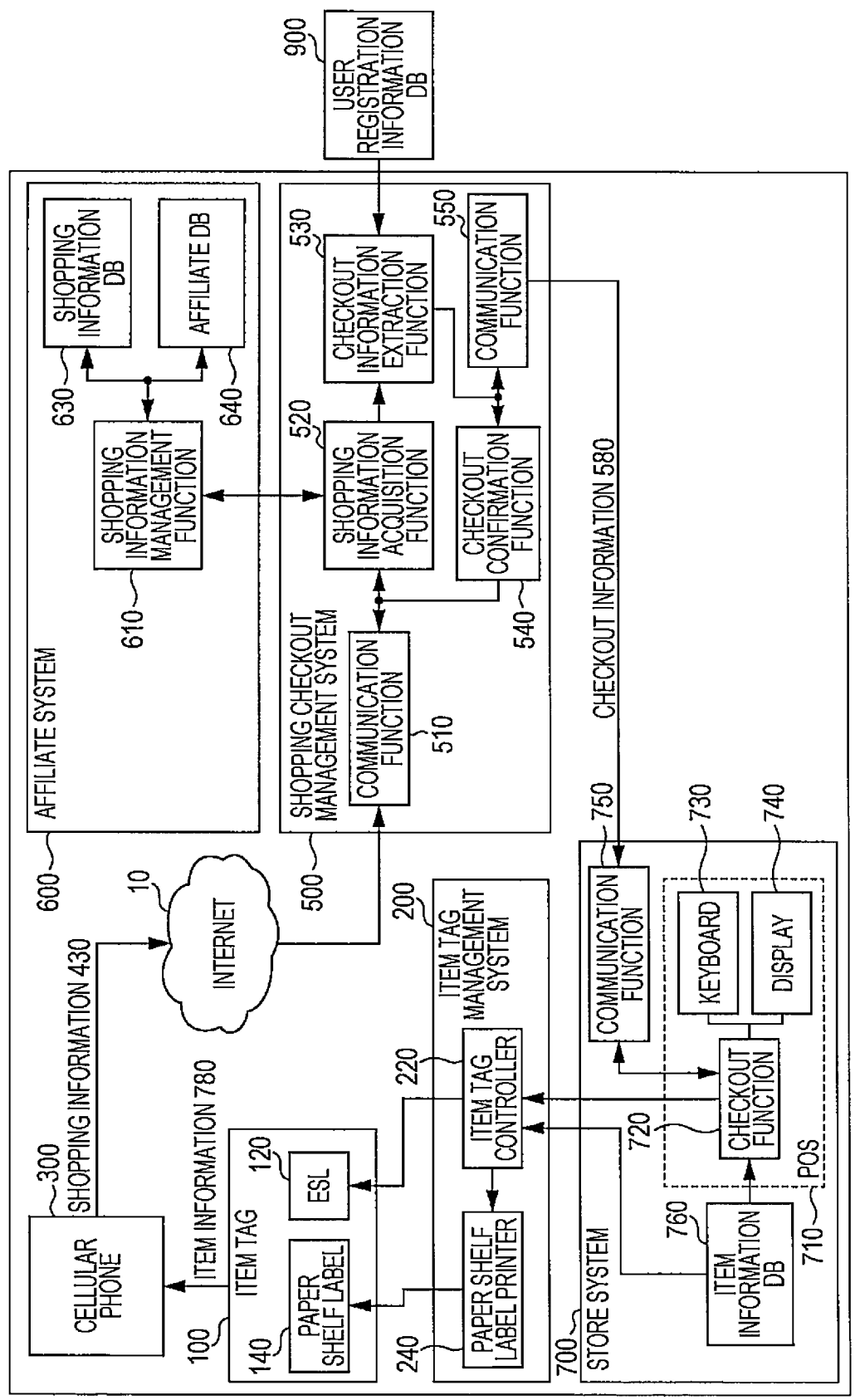
FIG. 2 illustrates a block diagram of functions of the overall coordinated mobile shopping system, in accordance with embodiments of the present invention.

FIG. 2 represents the above-described functions as a block diagram, in accordance with embodiments of the present invention.

The item tag 100 acquires item information 780 from the store system 700, stores it, and provides it by a method, such as displaying or printing.

The cellular phone 300 is an example of a mobile information reading device and acquires the item information 780 from the item tag 100 by using the two-dimensional barcode, NFC technology, or Bluetooth® technology.

The cellular phone 300 adds information, such as a user ID 431, a buying date and time 432, a quantity 434, and a subtotal 435, to the item information 780. The information may further include information on operation of the cellular phone 300 necessary to analyze a shopping action by a customer.

The cellular phone 300 repeats the above-described action in shopping, adds a checkout date and time 433 at the time of checkout, generates shopping information 430 (see FIGS. 5, 7, 9, and 11), and transfers it to the shopping checkout management system 500. Specifically, the cellular phone 300 connects to the Internet 10 using a cellular phone network, such as 3G or GSM® (registered trademark), and transfers the shopping information 430 to the shopping checkout management system 500. In FIGS. 5, 7, 9, and 11, the shopping information 430 is a shopping information table (SIT).

Such a cellular phone network has rapidly become available also in emerging nations, its communication areas are larger than those of WiFi® wireless LAN, and its security level to phone-tapping, tampering, and other illegal actions is also higher. If communication exits from the cellular phone network and is made over the Internet, encryption technology may preferably be used in information.

A shopping information acquisition function 520 in the shopping checkout management system 500 acquires the shopping information 430 from the cellular phone 300 through a communication function 510. A checkout information extraction function 530 acquires checkout registration information 585 corresponding to the user ID 431 in the shopping information 430 from a user registration information database 900, combines it with information (581 to 584) extracted from the shopping information 430, generates checkout information 580 (see FIG. 14), and transmits it to the store system 700 through a communication function 550. When a checkout is performed, a checkout confirmation function 540 receives a result of the checkout through the communication function 550 and confirms it and then transmits it to the cellular phone 300 having made the checkout processing request through the communication function 510. The cellular phone 300 displays the result of the checkout on its screen and ends the shopping.

The store system 700 includes the POS (point of sale) 710. The POS 710 includes a checkout function 720, a keyboard 730, and a display 740. The checkout function 720 performs checkout processing on the basis of information input from the keyboard 730 and displays the result on the display 740. The checkout function 720 also performs checkout processing on the basis of the checkout information 580 received from the shopping checkout management system 500 through a communication function 750. The checkout function 720 is an example of a checkout processing unit configured to perform checkout processing.

The store system 700 includes an item information database 760.

FIG. 3 illustrates an example of the configuration of the item information database 760, in accordance with embodiments of the present invention.

As illustrated, the item information database 760 stores item information, including a manufacturer 761, an item name 762, an item code 763, a price 764, and a store 765.

Referring back to FIG. 2 again, an item tag management system 200 is an example of a recording unit configured to record information. In the item tag management system 200, an item tag controller 220 acquires the item information 780 from the item information database 760 in the store system 700 and generates the item tag 100 for each of items sold in a store.

When the item tag 100 of the corresponding item is the ESL 120 (including the NFC tag), the item tag controller 220 changes the information in the ESL 120 if needed using wireless communication means, such as IR communication, low-power wireless communication, ZigBee, or NFC.

When the item tag 100 of the corresponding item is the paper shelf label 140 (including the paper tag), the item tag controller 220 transmits the item information 780 on the corresponding item to a paper shelf printer 240. The paper shelf printer 240 prints the item information 780 on the paper shelf label 140. In printing on the paper shelf label 140, in addition to regular indication, including an item name 782 and a price 784, more detailed item information (781 to 785) acquired from the item information database 760 is printed as code information, such as a two-dimensional barcode.

In the above-described basic configuration, an affiliate model for use in shopping at a brick-and-mortar store can be established by, for example, the following procedure. That is, first, a customer A (one example of a first buyer) scans the item tag 100 of an item X at a brick-and-mortar store using the cellular phone 300 and pays the price of the item X in cash or by a credit card. Then, the customer A receives the item X on which a sticker with the item tag 100 is attached, the item tag 100 in which his/her user ID is stored by indicating his/her intention to register as an affiliate, and then walks around the town such that the sticker is visible to advertise the item X. Then, a customer B (one example of a second buyer) scans the item tag 100 of the sticker attached to the item X. After that, the customer B may pay the price by a credit card to a brick-and-mortar store and receive the same item by delivery service or may pay the price in cash at a brick-and-mortar store and receive the same item. In response to this, the customer A, who bought the item X in advance of the customer B and advertises it, receives a reward at a later date. The reward may be provided in accordance with purchases resulting from the buying of the item. The reward may be provided in cash, by a point, or by the combination thereof. The provider of the reward may be a store, a mall, a manufacturer, a service provider, or a combination thereof.

An example that assumes the above-described affiliate model will be described in the embodiment below. However, other various variations may also be made.

First, in the above-described affiliate model, the customer A indicates his/her intention to register as an affiliate at the time of buying the item X. However, the customer A may indicate the intention at another point in time. For example, the customer A may indicate his/her intention to register as an affiliate after buying the item X, and using it for some time, and benefiting from it.

Second, in the above-described affiliate model, the buying of the item X by the customer A at a brick-and-mortar store is a condition for setting the customer A as an affiliate. However, the buying of the item X may not be the condition for setting a customer as an affiliate. For example, independently of whether the customer A bought the item X or not, registration as a person to sell the item X may be the condition for becoming an affiliate. In this sense, the customer A can be regarded as one example of a first user. In response to this, the customer B can be regarded as one example of a second user.

In the above-described affiliate model, either one of the following two types can be used as the item tag 100.

One type is the item tag 100 having an affiliate ID field for storing an affiliate ID for identifying an affiliate for an item. Examples of this type of the item tag 100 can include the ESL 120 indicating a two-dimensional barcode and the paper shelf label 140 (including the paper tag) on which a two-dimensional barcode is printed. An example of the two-dimensional barcode here can be a QR Code®. When this type of the item tag 100 is used, if a user who bought an item intends to register as an affiliate, the cellular phone 300 transfers information in which the user ID of that user is contained as an affiliate ID 786 in the shopping information 430 to the shopping checkout management system 500. As a result, the item tag controller 220 sets that user ID in the affiliate ID field and controls rewriting the affiliate ID in the ESL 120 or newly printing the affiliate ID on the paper shelf label 140 by the paper shelf printer 240.

Here, a "shelf label" for an item, such as the ESL 120 or paper shelf label 140, may also be used in a second variation of the above-described affiliate model. In this case, the affiliate ID of a person to sell (and the affiliate ID of each of one or more higher affiliates in an affiliate chain if it exists) is contained in the affiliate ID field in the "shelf label." One example sales form will be discussed below in which a person to sell carries a small number of items in stock (the person can also receive a reward for stock control), hands an item on the spot from stock, and if the item goes out of stock, the item is delivered from a store at a later date. In such a sales form, a tag may be attached to each of all items or may also be attached to only a "sample" carried by the person to sell. In the latter case, although the tag has a tag shape, it is used as a "shelf label" which is a representative of items available in stock as well as items to be delivered.

The other type is the item tag 100 in which a unique ID that is unique to an item tag was written, for example, before shipment. An example of this type of the item tag 100 can be an NFC tag on which NFC data is electronically written. When this type of the item tag 100 is used, if a user who bought an item intends to register as an affiliate, the cellular phone 300 transfers information in which its unique ID is contained in the shopping information 430 and the user ID of that user is contained as the affiliate ID 786 in the shopping information 430 to the shopping checkout management system 500. As a result, the unique ID and the affiliate ID are associated with each other in the system side. The unique ID is an ID unique to an item tag in the embodiment below. However, it may be an ID unique to an item, such as a production number (serial number). In that case, the unique ID is uniquely generated in the system side, and the item tag controller 220 also writes the unique ID into the item tag 100.

Here, the use of the item tag 100 is divided into two types. Both of the former and latter types of the item tag 100 can also be used for a single item. For example, when a user scans a tag with a two-dimensional barcode printed thereon and then makes a request to deliver an item from a store, where items have NFC tags, the user will receive the item with the NFC tag.

The item tag 100 having the affiliate ID field will be described below as the paper shelf label 140, which is a typical example, and the item tag 100 with the unique ID being written therein will be described below as the NFC tag, which is a typical example. This description is merely for the sake of convenience, does not intend to exclude elements other than the paper shelf label 140 from the item tag 100 having the affiliate ID field or exclude elements other than the NFC tag from the item tag 100 with the unique ID being written therein, and allows the NFC tag to be included in the item tag 100 having the affiliate ID field and allows the paper shelf label 140 to be included in the item tag 100 with the unique ID being written therein.

When an affiliate model in shopping at a brick-and-mortar store needs to be established, the affiliate system 600 is added.

A shopping information management function 610 in the affiliate system 600 reads the shopping information 430 from the shopping information acquisition function 520 in the shopping checkout management system 500 and updates a shopping information database 630 with this shopping information 430. At this time, when a unique ID 787 in the shopping information 430 is not absent (when the item tag 100 is an NFC tag), if an affiliate registration intention 788 is "YES," because this shopping information 430 is generated by scanning the item tag 100 to buy the item for himself/herself and by performing an operation for registering as an affiliate, the shopping information management function 610 registers association between the affiliate ID 786 and the unique ID 787 in an affiliate database 640. When the unique ID 787 in the shopping information 430 is not absent (when the item tag 100 is an NFC tag), if the field for the affiliate ID 786 is absent, because this shopping information 430 is generated by scanning the item tag 100 to buy another item that is the same as the item bought by another user, the shopping information management function 610 sets, in the field for the affiliate ID 786 in the shopping information 430, affiliate IDs 643 to 645 associated with a unique ID 641 in the affiliate database 640. The affiliate database 640 is an example of a storage unit configured to store association information in which a first individual of the item is associated with the first buyer. In FIGS. 10, 12, 20-1, and 20-2, the affiliate database 640 is an affiliate database table (ADT) stored in a storage unit of a computer or computer system.

In addition, when the field for the unique ID 787 in the shopping information 430 is absent (when the item tag 100 is the paper shelf label 140), if the affiliate registration intention 788 is "YES," the shopping information management function 610 in the affiliate system 600 returns the shopping information 430 in which information that instructs generating a new item tag 100 is added to the user ID 431 to the shopping information acquisition function 520 in the shopping checkout management system 500. The shopping information acquisition function 520 in the shopping checkout management system 500 replaces the shopping information 430 acquired from the cellular phone 300 with the shopping information 430 acquired from the shopping information management function 610.

In the above-described configuration, the shopping information 430 generated by scanning the item tag 100 of an item without reference to advertisement by an affiliate is an example of first buying information indicating that a first buyer is making a request to buy a first individual of the item and indicating that the first buyer is to be an affiliate for the first individual of the item.

The shopping information 430 generated by scanning the item tag 100 through advertisement by an affiliate is an example of second buying information indicating that the second buyer is making a request to buy a second individual of the item and indicating that the buying of the item by the second buyer results from an action as the affiliate by the first buyer associated with the item information in new item information when the item tag 100 is the paper shelf label 140, and is an example of second buying information indicating that the second buyer is making a request to buy the second individual of the item when the item tag 100 is an NFC tag.

The shopping information acquisition function 520 in the shopping checkout management system 500 is an example of an acquisition unit configured to acquire first buying information and configured to acquire second buying information when the item tag 100 is the paper shelf label 140. The shopping information acquisition function 520 is an example of an acquisition unit configured to acquire first buying information, configured to acquire second buying information, and configured to update the second buying information such that the buying of the item by the second buyer results from an action as the affiliate by the first buyer associated with the first individual of the item in the association information when the item tag 100 is an NFC tag.

The checkout information extraction function 530 in the shopping checkout management system 500 is an example of a control unit configured to conduct control such that the price of the first individual of the item is paid by the first buyer and new item information in which the item information and the first buyer are associated with each other is recorded on a new item tag to be newly attached to the first individual of the item and configured to conduct control such that the price of the second individual of the item is paid by the second buyer and the reward is paid to the first buyer when the item tag 100 is the paper shelf label 140. The checkout information extraction function 530 is an example of a control unit configured to conduct control such that the price of the first individual of the item is paid by the first buyer and configured to conduct control that the price of the second individual of the item is paid by the second buyer and the reward is paid to the first buyer when the item tag 100 is an NFC tag.

In the above-described configuration, the shopping information management function 610 in the affiliate system 600 is an example of a control unit configured to conduct control such that a first user is registered as an affiliate in association with an item or service.

The shopping information management function 610 in the affiliate system 600 is also an example of a determination unit configured to determine that the first user is an affiliate or one of affiliates enticing a second user to buy the item or service.

FIG. 4 illustrates an example of information recorded on the item tag 100 of an item ("socks") that has not yet been bought at a brick-and-mortar store, in accordance with embodiments of the present invention.

Because the item tag 100 is the paper shelf label 140 in FIG. 4, the information recorded on the item tag 100 contains the field for the affiliate ID. However, because the item has not yet been bought, no specific information is recorded in the field for the affiliate ID.

A case will be discussed below in which a user of the user ID "274431" scans the item tag 100 illustrated in FIG. 4 using the cellular phone 300 and performs an operation for registering as an affiliate.

FIG. 5 illustrates an example of the shopping information 430 generated in this case, in accordance with embodiments of the present invention. The user of the user ID "274431"

scans not only the item tag 100 of "socks" but also the item tag 100 of each of "bag" and "cola" using the cellular phone 300.

As illustrated, the shopping information 430 includes the user ID 431 and purchase information including buying date and time 432, checkout date and time 433, quantity 434, and subtotal 435, which are added to the item information 780 acquired from the item tags 100. As for the "socks," because the operation for registering as an affiliate is performed, "YES" is set as the affiliate registration intention 788, and the user ID "274431" is set as the affiliate ID 786.

This shopping information 430 is transferred to the shopping checkout management system 500 over the Internet 10, and the checkout information 580 (see FIG. 14) extracted from this shopping information 430 is transferred to the item tag controller 220 through the store system 700. In this case, as described below, because the checkout information 580 indicates that the paper shelf label 140 is to be printed, the item tag controller 220 prints the paper shelf label 140 in which the user ID "274431" is set as the affiliate ID in the item tag 100 illustrated in FIG. 4 using the paper shelf printer 240.

FIG. 6 illustrates an example of information recorded on the item tag 100 printed in the above-described way, in accordance with embodiments of the present invention. It is to be noted that the item is not the "socks" to which the item tag 100 illustrated in FIG. 4 is attached but "shoes." The user who bought the "shoes" and registered as an affiliate is also not the user who bought the "socks" and registered as an affiliate but a user of the user ID "198413." That is, the user ID "198413" is recorded as the affiliate ID.

A case will be discussed below in which the user of the user ID "198413" advertises, as an affiliate in town, the "shoes" to which the item tag 100 illustrated in FIG. 6 is attached, and a user of the user ID "035063" seeing it scans the item tag 100 using the cellular phone 300.

FIG. 7 illustrates an example of the shopping information 430 generated in this case, in accordance with embodiments of the present invention. The user of the user ID "035063" scans not only the item tag 100 of the "shoes" but also the item tag 100 of each of "potato chips" and "chocolate" using the cellular phone 300.

As illustrated, the shopping information 430 includes the user ID 431 and the purchase information including buying date and time 432, checkout date and time 433, quantity 434, and subtotal 435, which are added to the item information 780 acquired from the item tags 100. As for the "shoes," because the buying results from the advertisement by the affiliate of the user ID "198413," the user ID "198413" is set as the affiliate ID 786.

If the user of the user ID "035063" intends to register as an affiliate with respect to the buying of this item, the user ID "198413" and the user ID "035063" are listed in the field for the affiliate ID 786, and the affiliate registration intention 788 is set at "YES." Of the user IDs listed in the field for the affiliate ID 786, a user ID that matches with the user ID 431 is regarded as an affiliate newly registered in response to the buying of this item and can be distinguished from one or more affiliates contributed to the buying of this item.

This shopping information 430 is transferred to the shopping checkout management system 500 over the Internet 10, and the checkout information 580 (see FIG. 14) extracted from this shopping information 430 is transferred to the item tag controller 220 through the store system 700. In this case, if the user of the user ID "035063" does not perform an operation for registering as an affiliate, the checkout information 580 does not indicate that the paper shelf label 140 is to be printed, and thus the item tag controller 220 does not perform processing for printing the item tag 100.

FIG. 8 includes illustrations of examples of information recoded on an NFC tag being an example of the item tag 100, in accordance with embodiments of the present invention.

In FIG. 8, (a) illustrates an example of information recorded on the NFC tag attached to a "ball," and (b) illustrates an example of information recorded on the NFC tag attached to "pants."

Because the item tag 100 is the NFC tag, the information recorded on the item tag 100 contains the unique ID in both (a) and (b).

A case will be discussed below in which a user of the user ID "060087" scans the item tag 100 illustrated in FIG. 8(a) using the cellular phone 300 and performs an operation for registering as an affiliate. In this case, another user advertises, as an affiliate in town, the "pants" to which the item tag 100 illustrated in FIG. 8(b) is attached, and the user of the user ID "060087" seeing it scans the item tag 100 using the cellular phone 300.

FIG. 9 illustrates an example of the shopping information 430 generated in this case, in accordance with embodiments of the present invention. The user of the user ID "060087" scans not only the item tag 100 of each of the "ball" and "pants" but also the item tag 100 of a "shirt" using the cellular phone 300.

As illustrated, the shopping information 430 includes the user ID 431 and the purchase information including buying date and time 432, checkout date and time 433, quantity 434, and subtotal 435, which are added to the item information 780 acquired from the item tags 100. As for the "ball" and "pants," because each of the item tags 100 is an NFC tag, a value read from each of the item tags is set as the unique ID 787. As for the "ball," because an operation for registering as an affiliate is performed, "YES" is set as the affiliate registration intention 788, and the user ID "060087" is set in the field for the affiliate ID 786.

In contrast, as for the item tag 100 illustrated in FIG. 8(b), because the user ID of the user who advertises the "pants" as an affiliate is not recorded on the item tag 100, no specific information is recorded in the field for the affiliate ID 786 corresponding to the "pants" in the shopping information 430 in FIG. 9. For this record, a user ID acquired by referring to the affiliate database 640 is to be recorded in the field for the affiliate ID 786.

FIG. 10 illustrates an example of the configuration of the affiliate database 640 at the time when the shopping information 430 illustrated in FIG. 9 is transferred to the affiliate system 600, in accordance with embodiments of the present invention.

At this time, "03221221376419" is registered as the unique ID 641. For this unique ID, "035063" is registered as the affiliate ID 643 in registrant information 642.

FIG. 11 illustrates an example of the shopping information 430 in which the shopping information 430 illustrated in FIG. 9 is updated by referring to the affiliate database 640 illustrated in FIG. 10, in accordance with embodiments of the present invention.

No specific information is recorded in the field for the affiliate ID 786 corresponding to the "pants" in the shopping information 430 illustrated in FIG. 9. In contrast, the affiliate ID 643 of "035063," which is associated with the unique ID 641 of "03221221376419" in the affiliate database 640 illustrated in FIG. 10, is recorded in the field for the affiliate ID 786 corresponding to the "pants" in the shopping information 430 illustrated in FIG. 11.

Because the user of the user ID "060087" performs an operation for registering as an affiliate at the time of scanning the item tag 100 illustrated in FIG. 8(*a*) with the cellular phone 300, "060087" is recorded in the field for the affiliate ID 786, and "04621525108413" is recorded as the unique ID 787 for the "ball" in FIG. 9. The shopping information management function 610 in the affiliate system 600 registers the association between data in the field for the affiliate ID 786 and the unique ID 787 in the affiliate database 640.

FIG. 12 illustrates an example of the configuration of the affiliate database 640 at the time of registering this association, in accordance with embodiments of the present invention.

In FIG. 12, the above-described association is registered as the unique ID 641 and the affiliate ID 643 in the second row.

FIG. 13 illustrates an example of the configuration of the shopping information database 630 containing the pieces of shopping information 430 illustrated in FIGS. 5, 7, and 11, in accordance with embodiments of the present invention. The shopping information database 630 also contains the shopping information 430 generated by scanning the item tag 100 of each of a "gum" and a "jacket" by the user of a user ID 631 of "035063."

FIG. 14 illustrates an example of the checkout information 580 extracted by the checkout information extraction function 530 from the shopping information 430 returned from the shopping information management function 610 to the shopping information acquisition function 520, in accordance with embodiments of the present invention.

In FIG. 14, records corresponding to the same user ID 581 belong to the same checkout processing. It is to be noted that, if two IDs are recorded in the field for the user ID 581 for a single record, the upper section indicates the user ID 581, and the lower section indicates the affiliate ID. A user who has performed an operation for registering as an affiliate is written such that "A" is suffixed to the user ID 581 to show that the item tag 100 is to be printed. Hereinafter, this "A" is referred to as "affiliate registration information."

That is, first, the first three records corresponding to the user ID 581 of "035063" belong to the same checkout processing. In the lower section of the second record of these three records, information indicating that, because the item was bought in response to advertisement by the user of the user ID "198413" acting as an affiliate, the reward "5%" of the price of the item will be paid into a "checkout account aaaaaaa" of this user is recorded.

The next three records corresponding to the user ID 581 of "060087" belong to the same checkout processing. In the lower section of the second record of these three records, information indicating that, because the item was bought in response to advertisement by the user of the user ID "035063" acting as an affiliate, the reward "5%" of the price of the item will be paid into a "checkout account bbbbbbb" of this user is recorded. In the third record, the affiliate registration information "A" suffixed to the user ID 581 of "060087" indicates that, because the user of the user ID 581 of "060087" has performed an operation for registering as an affiliate, the item tag 100 is to be printed. In this case, because the item tag 100 is an NFC tag, if the unique ID is an ID unique to the NFC tag, item information containing the user ID is not written in the item tag 100.

The next three records corresponding to the user ID 581 of "274431" belong to the same checkout processing. In the second record of these three records, the affiliate registration information "A" suffixed to the user ID 581 of "274431" indicates that, because the user of the user ID 581 of "274431" has performed an operation for registering as an affiliate, the item tag 100 is to be printed. In this case, because the item tag 100 is the paper shelf tag 140, item information containing the user ID is printed.

The last two records corresponding to the user ID 581 of "035063" belong to the same checkout processing.

That is, FIG. 14 indicates that four checkout processing elements are sequentially sent to the shopping checkout management system 500.

FIG. 15 is a flowchart that illustrates an example of operations of the item tag management system 200, in accordance with embodiments of the present invention.

When the item tag management system 200 detects a change in the item information database 760 in the store system 700 or the affiliate registration information in the checkout information 580 at step 254, the item tag management system 200 then acquires the item information 780 for the item corresponding to the changed item information or for the item corresponding to the affiliate registration information at step 256. Subsequently, the item tag management system 200 generates information to be stored in the item tag 100 at step 258, generates the two-dimensional barcode or NFC data from the information at step 260, and transmits the two-dimensional barcode to the paper shelf printer 240 or the ESL 120 or transmits the NFC data to the NFC tag at step 262. After that, the item tag management system 200 determines whether there exists another item corresponding to the changed item information or corresponding to the affiliate registration information at step 264. When such an item exists, the item tag management system 200 performs the above-described processing again.

Figure 16:
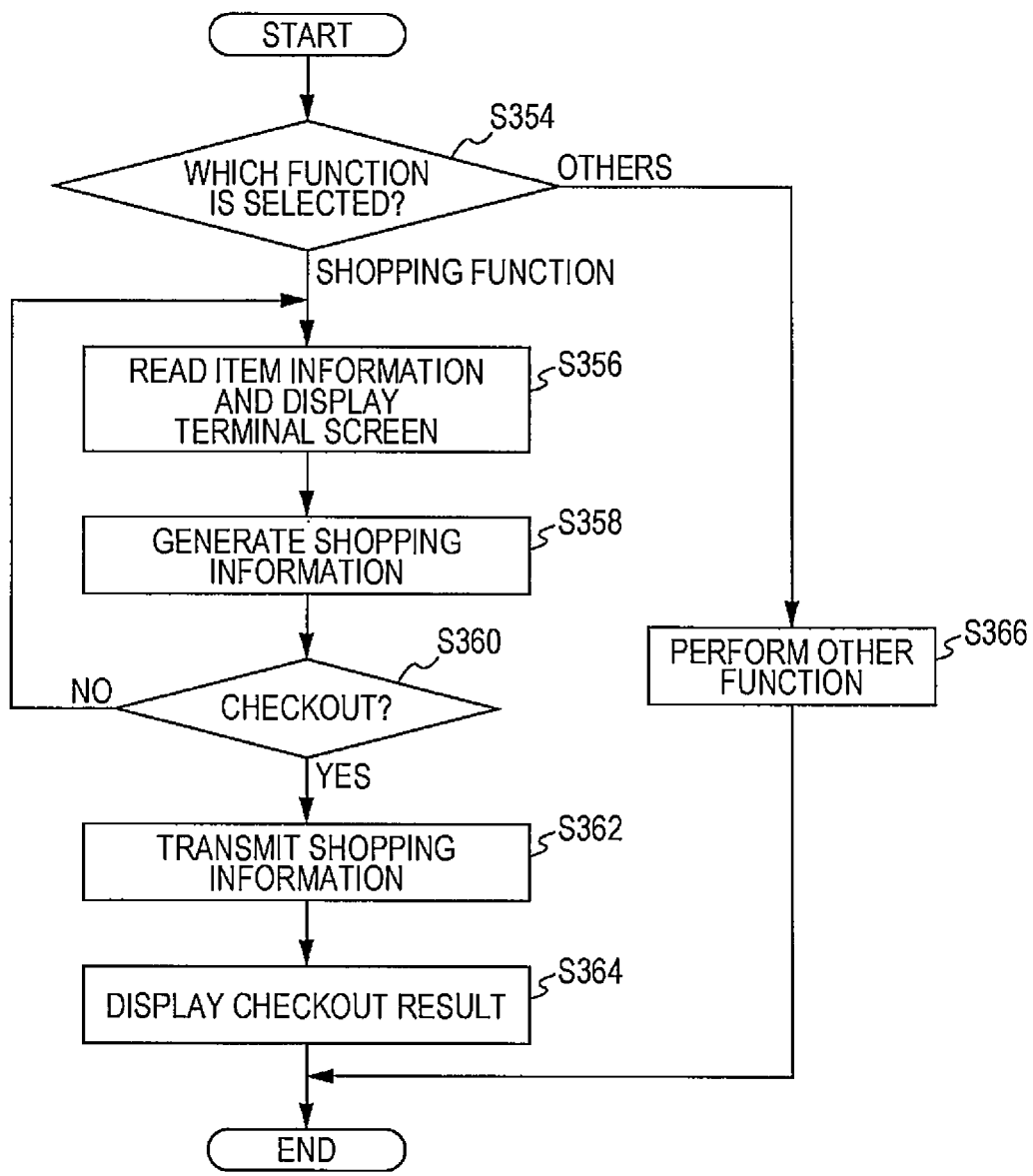
FIG. 16 is a flowchart that illustrates an example of operations of the cellular phone, in accordance with embodiments of the present invention.

FIG. 16 is a flowchart that illustrates an example of operations of the cellular phone 300, in accordance with embodiments of the present invention.

Because the shopping app in the cellular phone 300 supports various functions, a function is selected at step 354. When the shopping function is selected, the cellular phone 300 displays a shopping screen, scans the item tag 100, and acquires the item information 780 at step 356. At step 358, the shopping information 430 (in which the checkout date and time 433 is not set) is generated. At this time, if an operation for registering as an affiliate has been performed using the cellular phone 300, "YES" is set in the affiliate registration intention 788, and, for example, the individual identification number of the cellular phone 300 is contained as the user ID 431 in the shopping information 430. Subsequently, when checkout is selected at step 360, the cellular phone 300 generates the shopping information 430 in which the checkout date and time 433 is set and transmits it to the shopping checkout management system 500 at step 362. At step 364, the cellular phone 300 acquires the result of the checkout from the shopping checkout management system 500 and displays it. When a function other than the shopping function is selected at step 354, the selected function is performed at step 366.

Figure 17:
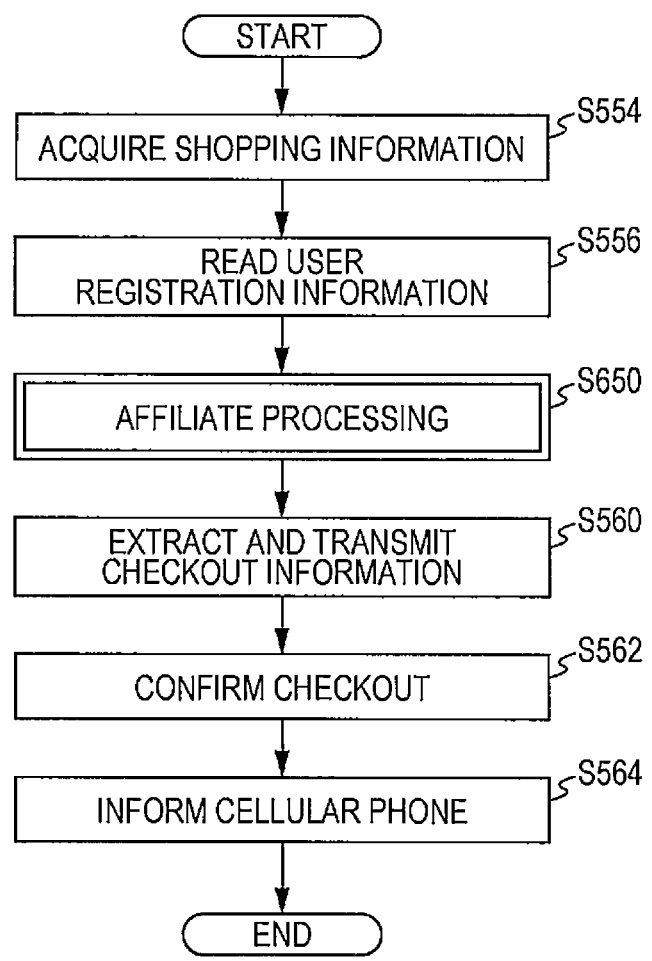
FIG. 17 is a flowchart that illustrates an example of operations of the shopping checkout management system, in accordance with embodiments of the present invention.

FIG. 17 is a flowchart that illustrates an example of operations of the shopping checkout management system 500, in accordance with embodiments of the present invention.

When the shopping checkout management system 500 receives a checkout request from the cellular phone 300, the shopping information acquisition function 520 acquires the shopping information 430 at step 554, and the checkout information extraction function 530 acquires registration information for a customer (user) owning this cellular phone 300 from the user registration information database 900 by using the user ID 431 extracted from the shopping information 430 at step 556. The acquired information contains the checkout registration information 585 (e.g., a credit card number, cash settlement, checkout account number) to be contained in the checkout information 580. The checkout registration information 585 is registered in the user registration information database 900 by this customer (user) at the time of beginning using a mobile shopping system from a PC at a store or the cellular phone, together with a license agreement for personal information that will be acquired in this system, such as purchase actions and trends.

Subsequently, at step 650, the affiliate system 600 reads the shopping information 430 from the shopping information acquisition function 520 and performs affiliate processing described below, and returns the shopping information 430 after the affiliate processing to the shopping information acquisition function 520.

After that, at step 560, the checkout information extraction function 530 extracts information necessary for checkout, such as the user ID 431, an item code 783 that identifies the item, a purchase price 784 of the item, and the quantity 434 of the item purchased, from the shopping information 430 and adds the checkout registration information 585 acquired at step 556 to generate the checkout information 580, and transmits the checkout information 580 to the store system 700. At step 562, the checkout confirmation function 540 confirms the checkout. At step 564, the cellular phone 300 is informed. Then a series of checkout processing is completed.

Figure 18:
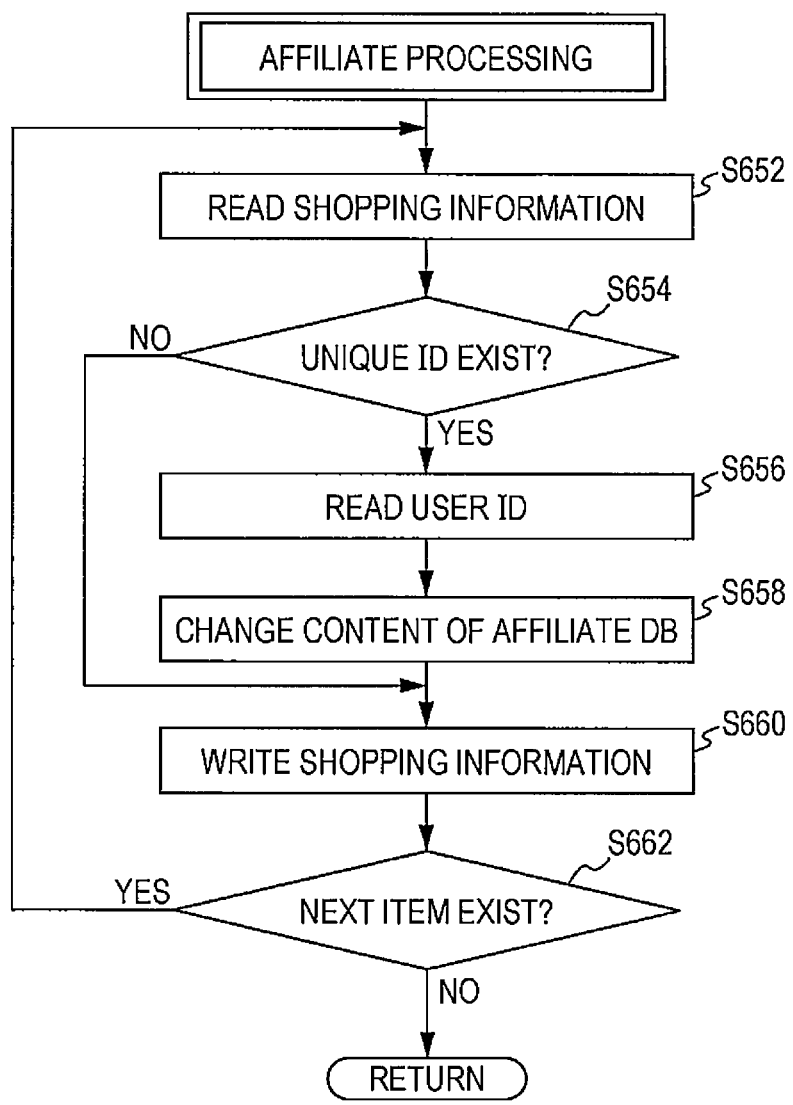
FIG. 18 is a flowchart that illustrates an example of operations of an affiliate system, in accordance with embodiments of the present invention.

FIG. 18 is a flowchart that illustrates an example of operations of the affiliate system 600, in accordance with embodiments of the present invention.

When affiliate processing is called at step 650 in the flowchart for the shopping checkout management system 500 in FIG. 17, the shopping information management function 610 reads the shopping information 430 from the shopping information acquisition function 520 at step 652 and determines whether there is the unique ID 787 in a single item in the shopping information 430 at step 654. That is, it determines whether the shopping information 430 is generated by scanning an NFC tag.

When it is determined at step 654 that the unique ID 787 exists in the shopping information 430, the affiliate IDs are determined by utilizing associations between affiliate IDs and the unique ID in the affiliate database 640 that matches the unique ID in the unique ID field of the NFC tag 100. Specifically, the shopping information management function 610 reads data stored in the fields for the affiliate IDs 643 to 645 associated with the unique ID 641 from the affiliate database 640 and records the data in the field for the affiliate ID 786 in the shopping information 430 at step 656. In this case, if data has already exists in the field for the affiliate ID 786 in the shopping information 430, the data in the fields for the affiliate IDs 643 to 645 is additionally recorded. Subsequently, at step 658, if the affiliate registration intention 788 contained in the shopping information 430 is "YES," the shopping information management function 610 registers the association between the already existing data in the field for the affiliate ID 786 and the unique ID 787 in the affiliate database 640 and changes its content. At step 660, the shopping information management function 610 writes the shopping information 430 to the shopping information database 630.

When it is determined at step 654 that the unique ID 787 does not exist in the shopping information 430, the affiliate IDs are obtained from the affiliate ID field of the paper shelf label 140 in the item tag 100, and the shopping information management function 610 directly writes the shopping information 430 to the shopping information database 630 at step 660.

At step 660, the shopping information 430 is returned to the shopping information acquisition function 520. If the affiliate registration intention 788 contained in the shopping information 430 is "YES," because an operation for registering as an affiliate has been performed, the user ID 431 with the affiliate registration information "A" being provided thereto is returned.

After that, at step 662, it is determined whether there exists another item in the shopping information 430. When such an item exists, the above-described processing is performed again.

An affiliate chain will be described below. In this affiliate chain, a user as an affiliate entices another user to buy an item, and this type of relationship links to a plurality of users.

Figure 19:
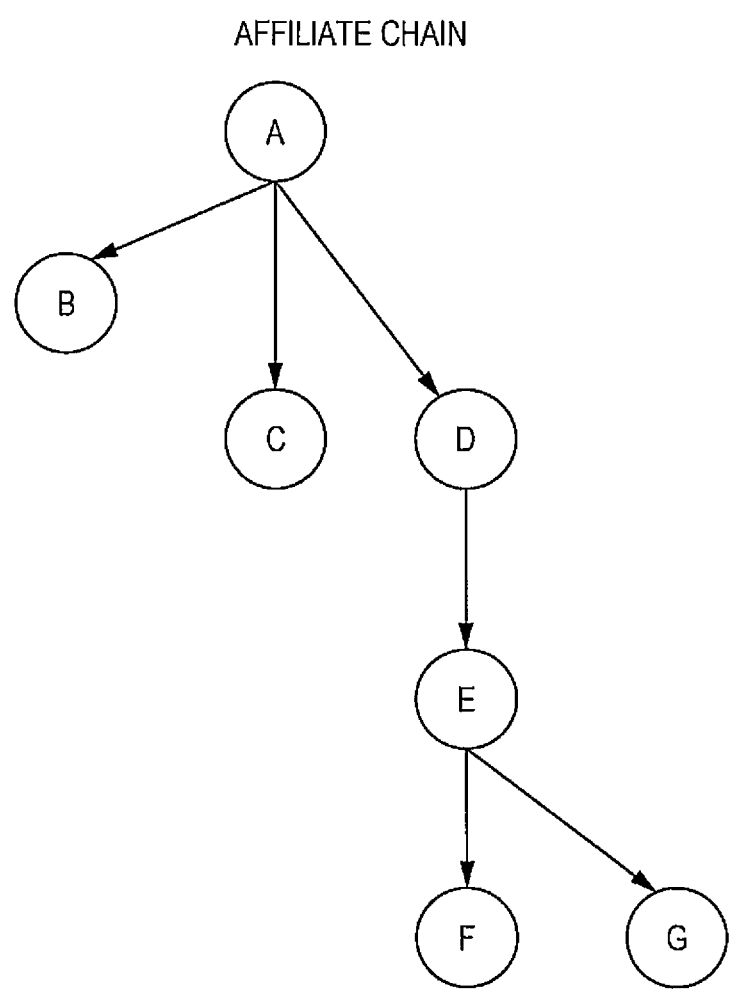
FIG. 19 schematically illustrates an example of an affiliate chain, in accordance with embodiments of the present invention.

FIG. 19 schematically illustrates an example of the affiliate chain, in accordance with embodiments of the present invention.

FIG. 19 indicates that users B, C, and D bought the item X in response to advertisement of the item X by a user A as an affiliate, a user E bought the item X in response to advertisement of the item X by the user D as an affiliate, and users F and G bought the item X in response to advertisement of the item X by the user E as an affiliate.

FIGS. 20-1 and 20-2 illustrate how the content of the affiliate database 640 changes at this time, in accordance with embodiments of the present invention. The user IDs of the users A to G are referred to as "A" to "G," respectively, the unique IDs of individuals of the item X that are actually received by the users A to G are referred to as "a" to "g," respectively, and all of the users perform an operation for registering as an affiliate at the time of buying the item X.

In FIG. 20-1, (a) illustrates the content of the affiliate database 640 at the point in time when the user A buys the item X. At this point in time, information indicating that the user of the affiliate ID 643 of "A" is the affiliate for the item X of the unique ID 641 of "a" is stored.

In FIG. 20-1, (b) illustrates the content of the affiliate database 640 at the point in time when the users B, C, and D buy the item X in response to advertisement by the user A. At this point in time, for the item X of the unique ID 641 of "b," information indicating that the user of the affiliate ID 644 of "B" is one of the affiliates and, if another user buys the item X in response to advertisement by the user B, the user of the affiliate ID 643 of "A" also contributes as one of the affiliates is stored. For the item X of the unique ID 641 of "c," information indicating that the user of the affiliate ID 644 of "C" is one of the affiliates and, if another user buys the item X in response to advertisement by the user C, the user of the affiliate ID 643 of "A" also contributes as an affiliate is stored. For the item X of the unique ID 641 of "d," information indicating that the user of the affiliate ID 644 of "D" is one of the affiliates and, if another user buys the item X in response to advertisement by the user D, the user of the affiliate ID 643 of "A" also contributes as one of the affiliates is stored.

In FIG. 20-1, (c) illustrates the content of the affiliate database 640 at the point in time when the user E buys the item X in response to advertisement by the user D. At this point in time, for the item X of the unique ID 641 of "e," information indicating that the user of the affiliate ID 645 of "E" is one of the affiliates and, if another user buys the item X in response to advertisement by the user E, the user of the affiliate ID 643 of "A" and the user of the affiliate ID 644 of "D" also contribute as part of the affiliates is stored.

In FIG. 20-1, (d) illustrates the content of the affiliate database 640 at the point in time when the users F and G buy the item X in response to advertisement by the user E. At this point in time, for the item X of the unique ID 641 of "f," information indicating that the user of the affiliate ID 646 of "F" is one of the affiliates and, if another user buys the item X in response to advertisement by the user F, the user of the affiliate ID 643 of "A," the user of the affiliate ID 644 of "D," and the user of the affiliate ID 645 of "E" also contribute as part of the affiliates is stored. For the item X of the unique ID 641 of "g," information indicating that the user of the affiliate ID 646 of "G" is one of the affiliates and, if another user buys the item X in response to advertisement by the user G, the user of the affiliate ID 643 of "A," the user of the affiliate ID 644 of "D," and the user of the affiliate ID 645 of "E" also contribute as part of the affiliates is stored.

If a user as an affiliate entices another user to buy an item and this type of relationship links to a plurality of users, all the plurality of users are registered as affiliates. However, the embodiment is not limited to this example. For example, of the plurality of users, only the first N persons may be registered as affiliates, or only the last N persons may be registered as affiliates (N is a natural number). Among the plurality of users, only users before and after one or more users standing midway may also be registered as affiliates.

That is, for the chain of the users A, D, E, and F illustrated in FIG. 19, four cases are discussed. In first and second cases, the user A is an example of the first user. In third and fourth cases, the user D is an example of the first user. In the first case, the user D is registered as an affiliate. In this case, the user A is an example of the first user, the user D is an example of the second user, and the user E is an example of the third user. In the second case, the user D is not registered as an affiliate. In this case, the user A is an example of the first user, the user D is an example of the second user, the user E is an example of the third user, and the user F is an example of the fourth user. In the third case, the user E is registered as an affiliate. In this case, the user D is an example of the first user, the user E is an example of the second user, and the user F is an example of the third user. In the fourth case, the user E is not registered as an affiliate. In this case, the user D is an example of the first user, the user E is an example of the second user, the user F is an example of the third user, and a user subsequent to the user F is an example of the fourth user.

In this example, how the content in the affiliate database 640 changes when the item tag 100 is an NFC tag is illustrated. If the item tag 100 is the paper shelf label 140, the database is not used, and a plurality of affiliate IDs are listed in the field for the affiliate ID in the paper shelf label 140, as in the case of the database.

When such an affiliate chain is grasped, the affiliate chain may be visualized, which user is an advocator may be clearly identified, and marketing or sales promotion focusing on that user may be considered.

The order in which the users bought an item or the order in which each of the users enticed another user to buy an item may be derived from the affiliate chain, and the amount of the reward (the amount of money or the number of points) to be provided to each of the affiliates may be determined according to the order. For example, the amount of the reward may be larger as the affiliate is later in the order, or the amount of the reward may be larger as the affiliate is earlier in the order. The same amount of the reward may be provided to a plurality of affiliates, independently of the order. The reward may be provided to only the first N affiliates among a plurality of affiliates, or the reward may be provided to only the last N affiliates among a plurality of affiliates (N is a natural number). The reward may be provided to only affiliates before and after one or more affiliates standing midway.

Moreover, aside from the affiliate chain, the number of sales for each affiliate may be grasped and visualized, and marketing or sales promotion focusing on, for example, the user who enticed another user to buy an item very often may be considered.

A two-dimensional barcode or an NFC enables a user or a third party, to which the user advertises an item, to buy the item by scanning the item tag 100 attached to the item. Adding information on the user who bought the item to the item tag 100 attached to the item or associating the information with the item tag 100 enables information indicating who is the buyer of the item enticing a shopper who saw the item to buy the item to be shown at the time of checkout, and a business model similar to the affiliate model in an EC site can also be achieved in a brick-and-mortar store.

The customer who bought the item can become an affiliate and get a reward if he or she so wishes. At this time, because it is ensured that the customer who actually bought the item introduces the item, exaggerated or incorrect expressions that may be a problem in an EC site can be avoided, and a person who plans to buy the item introduced by the customer who bought the item is able to observe and touch the item being actually used by the user and hear an assessment directly from the actual user before buying the item, unlike in an EC site. Accordingly, a person can satisfactorily purchase an item.

In addition, a brick-and-mortar store can not only conduct a business that sells items within the store but also develop new business in which a customer who bought or borrowed an item voluntarily introduces or sells the item. Depending on the case, a customer can also rent items from a store and develop business using mannequins or showroom business.

Moreover, when an affiliate chain is allowed to be grasped, which user is an advocator can be clearly identified, and efficient sales promotion using that user as its source can also be performed.

Lastly, a hardware configuration of a computer suitable for applying the present embodiment thereto will be described below.

Figure 21:
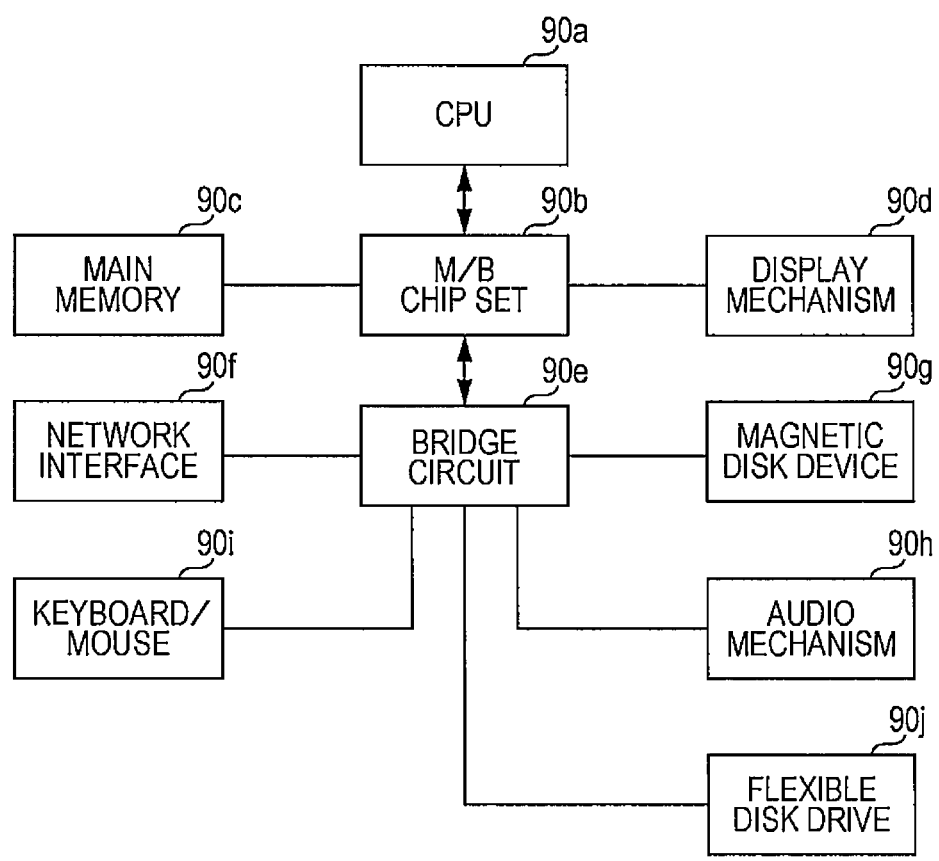
FIG. 21 illustrates an example of a hardware configuration of a computer or computer system, in accordance with embodiments of the present invention.

FIG. 21 illustrates an example of the hardware configuration of such a computer or computer system, in accordance with embodiments of the present invention. As illustrated, the computer includes a central processing unit (CPU) 90*a* being a calculation unit, a main memory 90*c* connected to the CPU 90*a* through a mother board (M/B) chip set 90*b*, and a display mechanism 90*d* also connected to the CPU 90*a* through the M/B chip set 90*b*. The M/B chip set 90*b* is also connected through a bridge circuit 90*e* to a network interface 90*f*, a magnetic disk device (HDD) 90*g*, an audio mechanism 90*h*, a keyboard/mouse 90*i*, and a flexible disk drive 90*j*.

In FIG. 21, the components are connected to one another through a bus. For example, the CPU 90*a* and the M/B chip set 90*b* are connected to each other through a CPU bus, the M/B chip set 90*b* and the main memory 90*c* are connected to each other through the CPU bus. The M/B chip set 90*b* and the display mechanism 90*d* may be connected to each other through an accelerated graphics port (AGP). If the display mechanism 90*d* includes a video card supporting PCI Express, the display mechanism 90*d* and this video card are connected to each other through a PCI Express (PCIe)

bus. In connecting to the bridge circuit 90e, for example, PCI Express can be used in the network interface 90f. For example, serial AT attachment (ATA), parallel ATA, or peripheral components interconnect (PCI) can be used in the magnetic disk device 90g. A universal serial bus (USB) can be used in the keyboard/mouse 90i and the flexible disk drive 90j.

The present invention may be achieved by hardware in its entirety or may be achieved by software in its entirety. The present invention can also be achieved by both hardware and software. The present invention can be achieved as a computer, a computer system, a data processing system, and a computer program. This computer program can be stored in a computer-readable storage medium or device (e.g., storage device or memory device). The storage medium or device can be an electronic, magnetic, optical, electromagnetic, or semiconductor system (apparatus or device). Examples of the computer-readable storage medium or device can include a semiconductor, a solid-state storage device, magnetic tape, a detachable computer diskette, a random-access memory (RAM), a read-only memory (ROM), a rigid magnetic disk, and an optical disk. Examples of the optical disk at the present time can include a compact-disk read-only memory (CD-ROM), a compact-disk read/write (CD-R/W), and a digital versatile disc (DVD). A computer-readable storage device of the present invention does not encompass signal propagation media such as copper cables, optical fibers and wireless transmission media.

A computer program product of the present invention comprises a computer readable storage device or memory (e.g., 90g, 90j) having computer readable program code stored therein, wherein the program code contains instructions which, upon being executed by a processor (e.g., CPU 90a) of a computer or computer system, implement the methods of the present invention.

A computer system of the present invention comprises a processor (e.g., CPU 90a), a memory (e.g., 90c) coupled to the processor, and a computer readable storage device (e.g., 90g, 90j) coupled to the processor, wherein the storage device contains program code which upon being executed by the processor via the memory implements the methods of the present invention. The present invention is described above using the embodiment. The technical scope of the present invention is not limited to the above-described embodiment. It is obvious to those skilled in the art that various changes may be made or alternative forms may be adopted without departing from the spirit and scope of the present invention.

What is claimed is:

1. A method for processing shopping information through use of affiliates, said method comprising:

receiving, from a shopping checkout management system by one or more processors of a computer system, shopping information in a table having columns and rows, each column being a field storing a unique portion of the shopping information, said shopping information having been previously received by the shopping checkout management system from a mobile device, said shopping information pertaining to a purchase of an item by a second user through use of the mobile device that scanned the shopping information from an item tag attached to the item while the item is made visible to the second user by a first user who is advertising the item, wherein a condition for the first user to become an affiliate is purchase, by the first user, of the item, said first user having satisfied the condition;

said one or more processors determining, from analysis of the shopping information, a set of affiliates wherein each affiliate of the set of affiliates is entitled to receive a reward due to the purchase of the item by the second user, wherein said determining the set of affiliates comprises: (a) determining that the set of affiliates comprises one or more affiliates identified by respective affiliate information included within the shopping information and included on the item tag; or (b) analyzing associations between affiliates and unique identification information denoted as a unique identifier (ID) and included in the shopping information and on the item tag, in affiliate information external to the shopping information, to determine affiliates of the set of affiliates, wherein the first user is an affiliate of the set of affiliates, and wherein implementing (a) or (b) comprises updating the shopping information in the table to include the set of affiliates and purchase information, said updating the shopping information in the table comprising:

storing a user ID of the second user in a user ID field of the table;

storing a date and time at which the item was purchased by the second user in a buying date and time field of the table;

storing a date and time at which the item was checked out after being purchased by the second user in a checkout date and time field of the table;

storing a quantity of the item purchased by the second user in a quantity field of the table;

storing a price paid for the quantity of the item purchased by the second user in a subtotal field of the table;

determining that an affiliate registration intention field of the table is YES and in response, storing the user ID of the second user as an affiliate ID of the second user in an affiliate ID field of the table;

determining that a unique ID is in a unique ID field of the table, wherein the unique ID that is unique to the item tag or is unique to the item to which the item tag is attached, and wherein the unique ID has a value differing from any value in any field of the table other than the unique ID field;

in response to determining that the unique ID is in the unique ID field of the table which is indicative of the unique ID also being in the item tag, determining an affiliate ID of at least one affiliate by utilizing associations between affiliate IDs and the unique ID in an affiliate database that matches the unique ID in the item tag and storing the affiliate ID of each affiliate of the at least one affiliate in the affiliate ID field of the table, wherein the at least one affiliate includes the first user;

in response to determining that the unique ID is in the unique ID field of the table and to determining that the affiliate registration intention field of the table is YES, storing in the affiliate database an association between the affiliate ID of the second user in the affiliate ID field of the table; and said one or more processors transmitting the updated shopping information in the table to the shopping checkout management system, wherein the affiliate ID field of the updated table identifies the set of affiliates entitled to receive respective rewards and also identifies the second user as an affiliate in the affiliate registration intention field of the table.

2. A computer program product, comprising a computer readable hardware storage device having computer readable program code stored therein, said program code containing instructions which, upon being executed by one or more processors via one or more memories of a computer system, process shopping information through use of affiliates, said program code comprising:
  program code for receiving, from a shopping checkout management system, shopping information in a table having columns and rows, each column being a field storing a unique portion of the shopping information, said shopping information having that had been previously received by the shopping checkout management system from a mobile device, said shopping information pertaining to a purchase of an item by a second user through use of the mobile device that scanned the shopping information from an item tag attached to the item while the item is made visible to the second user by a first user who is advertising the item, wherein a condition for the first user to become an affiliate is purchase, by the first user, of the item, said first user having satisfied the condition;
  program code for determining, from analysis of the shopping information, a set of affiliates wherein each affiliate of the set of affiliates is entitled to receive a reward due to the purchase of the item by the second user, wherein said determining the set of affiliates comprises: (a) determining that the set of affiliates comprises one or more affiliates identified by respective affiliate information included within the shopping information and included on the item tag; or (b) analyzing associations between affiliates and unique identification information denoted as a unique identifier (ID) and included in the shopping information and on the item tag, in affiliate information external to the shopping information, to determine affiliates of the set of affiliates, wherein the first user is an affiliate of the set of affiliates, and wherein implementing (a) or (b) comprises updating the shopping information in the table to include the set of affiliates and purchase information, said updating the shopping information in the table comprising:
    storing a user ID of the second user in a user ID field of the table;
    storing a date and time at which the item was purchased by the second user in a buying date and time field of the table;
    storing a date and time at which the item was checked out after being purchased by the second user in a checkout date and time field of the table;
    storing a quantity of the item purchased by the second user in a quantity field of the table;
    storing a price paid for the quantity of the item purchased by the second user in a subtotal field of the table;
    determining that an affiliate registration intention field of the table is YES and in response, storing the user ID of the second user as an affiliate ID of the second user in an affiliate ID field of the table;
    determining that a unique ID is in a unique ID field of the table, wherein the unique ID that is unique to the item tag or is unique to the item to which the item tag is attached, and wherein the unique ID has a value differing from any value in any field of the table other than the unique ID field;
    in response to determining that the unique ID is in the unique ID field of the table which is indicative of the unique ID also being in the item tag, determining an affiliate ID of at least one affiliate by utilizing associations between affiliate IDs and the unique ID in an affiliate database that matches the unique ID in the item tag and storing the affiliate ID of each affiliate of the at least one affiliate in the affiliate ID field of the table, wherein the at least one affiliate includes the first user;
    in response to determining that the unique ID is in the unique ID field of the table and to determining that the affiliate registration intention field of the table is YES, storing in the affiliate database an association between the affiliate ID of the second user in the affiliate ID field of the table; and
  program code for transmitting the updated shopping information in the table to the shopping checkout management system, wherein the affiliate ID field of the updated table identifies the set of affiliates entitled to receive respective rewards and also identifies the second user as an affiliate in the affiliate registration intention field of the table.

3. A computer system comprising one or more processors, one or more memories, and a computer readable hardware storage device having computer readable program code stored therein, said program code containing instructions which, upon being executed by the one or more processors via the one or more memories process shopping information through use of affiliates, said program code comprising:
  program code for receiving, from a shopping checkout management system, shopping information in a table having columns and rows, each column being a field storing a unique portion of the shopping information, said shopping information having been previously received by the shopping checkout management system from a mobile device, said shopping information pertaining to a purchase of an item by a second user through use of the mobile device that scanned the shopping information from an item tag attached to the item while the item is made visible to the second user by a first user who is advertising the item, wherein a condition for the first user to become an affiliate is purchase, by the first user, of the item, said first user having satisfied the condition;
  program code for determining, from analysis of the shopping information, a set of affiliates wherein each affiliate of the set of affiliates is entitled to receive a reward due to the purchase of the item by the second user, wherein said determining the set of affiliates comprises: (a) determining that the set of affiliates comprises one or more affiliates identified by respective affiliate information included within the shopping information and included on the item tag; or (b) analyzing associations between affiliates and unique identification information denoted as a unique identifier (ID) and included in the shopping information and on the item tag, in affiliate information external to the shopping information, to determine affiliates of the set of affiliates, wherein the first user is an affiliate of the set of affiliates, and wherein implementing (a) or (b) comprises updating the shopping information in the table to include the set of affiliates and purchase information, said updating the shopping information in the table comprising:
    storing a user ID of the second user in a user ID field of the table;
    storing a date and time at which the item was purchased by the second user in a buying date and time field of the table;

storing a date and time at which the item was checked out after being purchased by the second user in a checkout date and time field of the table;

storing a quantity of the item purchased by the second user in a quantity field of the table;

storing a price paid for the quantity of the item purchased by the second user in a subtotal field of the table;

determining that an affiliate registration intention field of the table is YES and in response, storing the user ID of the second user as an affiliate ID of the second user in an affiliate ID field of the table;

determining that a unique ID is in a unique ID field of the table, wherein the unique ID that is unique to the item tag or is unique to the item to which the item tag is attached, and wherein the unique ID has a value differing from any value in any field of the table other than the unique ID field;

in response to determining that the unique ID is in the unique ID field of the table which is indicative of the unique ID also being in the item tag, determining an affiliate ID of at least one affiliate by utilizing associations between affiliate IDs and the unique ID in an affiliate database that matches the unique ID in the item tag and storing the affiliate ID of each affiliate of the at least one affiliate in the affiliate ID field of the table, wherein the at least one affiliate includes the first user;

in response to determining that the unique ID is in the unique ID field of the table and to determining that the affiliate registration intention field of the table is YES, storing in the affiliate database an association between the affiliate ID of the second user in the affiliate ID field of the table; and program code for transmitting the updated shopping information in the table to the shopping checkout management system, wherein the affiliate ID field of the updated table identifies the set of affiliates entitled to receive respective rewards and also identifies the second user as an affiliate in the affiliate registration intention field of the table.

\* \* \* \* \*